US012617564B2

(12) United States Patent
Kriner

(10) Patent No.: US 12,617,564 B2
(45) Date of Patent: May 5, 2026

(54) REMOTE MODULAR DATA COLLECTION AND UAS DOCKING SYSTEM AND METHOD

(71) Applicant: GALE PROJECT TECHNOLOGIES, INC, New Braunfels, TX (US)

(72) Inventor: Jay Paul Kriner, New Braunfels, TX (US)

(73) Assignee: Gale Project Technologies, Inc., New Braunfels, TX (US)

( * ) Notice: Subject to any disclaimer, the term of this patent is extended or adjusted under 35 U.S.C. 154(b) by 0 days.

(21) Appl. No.: 19/286,051

(22) Filed: Jul. 30, 2025

(65) Prior Publication Data

US 2026/0035111 A1     Feb. 5, 2026

Related U.S. Application Data

(60) Provisional application No. 63/677,672, filed on Jul. 31, 2024.

(51) Int. Cl.
B64U 80/30          (2023.01)
B64U 70/92          (2023.01)
(Continued)

(52) U.S. Cl.
CPC ............. B64U 80/30 (2023.01); B64U 70/92 (2023.01); B64U 80/25 (2023.01); B64U 80/80 (2023.01);
(Continued)

(58) Field of Classification Search
CPC ........ B64U 70/92; B64U 80/25; B64U 80/80; H04Q 9/00
See application file for complete search history.

(56) References Cited

U.S. PATENT DOCUMENTS 9,387,928 B1 * 7/2016 Gentry ................... B64U 50/39
10,207,820 B2    2/2019 Sullivan et al.
(Continued)

OTHER PUBLICATIONS

International Search Report and Written Opinion dated Sep. 29, 2025 for PCT/US2025/039895.

*Primary Examiner* — Justin M Benedik
(74) *Attorney, Agent, or Firm* — Brett T. Cooke; EurekaIP Law, PLLC

(57)          ABSTRACT

A remote modular data collection system and method are disclosed, which in one or more embodiments, employs a plurality of data collection pods, which are interspersed within a geographical region and in communication with a remote control station. The pods include a variety of sensors adapted for particular purposes and may be arranged to preprocess data using artificial intelligence prior to transfer to the remote station and for autonomous operation. The pods are mountable on poles and other structures. In some embodiments, the pods are modular in design and construction, allowing quick installation and replacement of optional modules to satisfy particular data collection purposes. The pods may include integrated solar panels for flexible or redundant power purposes. In some embodiments, one or more pods each house an unmanned aerial vehicle, the sensors of which are integrated into the system and which allow for comprehensive on-demand data collection throughout the entirety of the geographical area. These pods include a hangar bay with a selectively retractable opening and charging pad for launching, recovery, storage, and charging of the unmanned aerial vehicle. The system may be used for terrestrial and/or extraterrestrial purposes, and it has particular application in security, military, environmental, law enforcement, and search and rescue operations, as well as an early detection and warning system.

30 Claims, 22 Drawing Sheets

(51) Int. Cl.
    *B64U 80/25*       (2023.01)
    *B64U 80/80*       (2023.01)
    *H04Q 9/00*        (2006.01)
    *B64U 101/31*     (2023.01)

(52) U.S. Cl.
    CPC ........... *H04Q 9/00* (2013.01); *B64U 2101/31*
          (2023.01); *H04Q 2209/40* (2013.01); *H04Q*
                               *2209/50* (2013.01)

(56)               References Cited

U.S. PATENT DOCUMENTS

| | | | |
|---|---|---|---|
| 10,457,421 B2 | 10/2019 | O'Toole | |
| 11,407,526 B2 | 8/2022 | Wang | |
| 12,079,015 B1 * | 9/2024 | Bradley | ................. G05D 1/661 |
| 12,258,153 B2 * | 3/2025 | Zhang | .................... B64U 70/99 |
| 12,296,981 B2 | 5/2025 | Kozlenko et al. | |
| 12,409,958 B2 * | 9/2025 | Alghanmi | .............. B64U 70/99 |
| 2006/0024046 A1 * | 2/2006 | Jones | ............... G08B 13/19632 |
| | | | 348/E7.085 |
| 2009/0088021 A1 * | 4/2009 | Kauffman | ............ G01J 1/0403 |
| | | | 439/552 |
| 2016/0161258 A1 * | 6/2016 | Magson | ............... G05D 1/0022 |
| | | | 701/467 |
| 2021/0269174 A1 * | 9/2021 | Shuff | ...................... B60L 58/24 |
| 2022/0392672 A1 * | 12/2022 | Getman | ............. A61H 23/0218 |
| 2023/0167653 A1 * | 6/2023 | Waters | ................... B64U 80/25 |
| | | | 244/114 R |

\* cited by examiner 109d 109c 108

109e 109b 109f 109a 116 112

115 105

REMOTE MODULAR DATA COLLECTION AND UAS DOCKING SYSTEM AND METHOD

CROSS REFERENCE TO RELATED APPLICATION

This non-provisional application claims priority under 35 USC 119 (e) to provisional application U.S. 63/677,672 filed Jul. 31, 2024 and entitled "Advanced UAV Housing System for Terrestrial and Space Applications,". which is incorporated herein by reference.

BACKGROUND

Emergency response operations and infrastructure monitoring in remote areas, particularly around areas with limited access or rapid accessibility, face significant challenges in quickly identifying and locating distressed individuals, infrastructure issues or security defenses. Traditional monitoring methods include remote cameras, weather stations, and the like, which often lack efficiency, rapid deployment capabilities, and the ability to cover large areas effectively.

Manned and unmanned aerial vehicles may be employed in particular instances when imaging or data collection is needed in areas that is not otherwise available from fixed base collection points, such as during flooding, conflagration, traffic accidents, et cetera. However, there exists a substantial delay time in deploying aerial assets to needed locations, resulting in a significant lag in available data streams with a concomitant risk to life and property.

An example of the insufficiency of current systems is illustrated by the Jul. 4, 2025 Kerville Texas flood, in which the Guadalupe River rose about 26 feet in 45 minutes, resulting in at least 137 fatalities. The system of the present disclosure, outfitted with sirens, would have provided an effective early detection and warning system, alerting unsuspecting victims and saving many lives, as well as aiding immediate search and rescue operations.

Overall, a system and method is needed for enhancing environmental, infrastructure and security monitoring, response and inspection, greatly increasing situation identification and communication in emergency situations, and saving lives and property.

BRIEF DESCRIPTION OF THE DRAWINGS

Many aspects of the present disclosure can be better understood with reference to the following drawings, in which.

The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
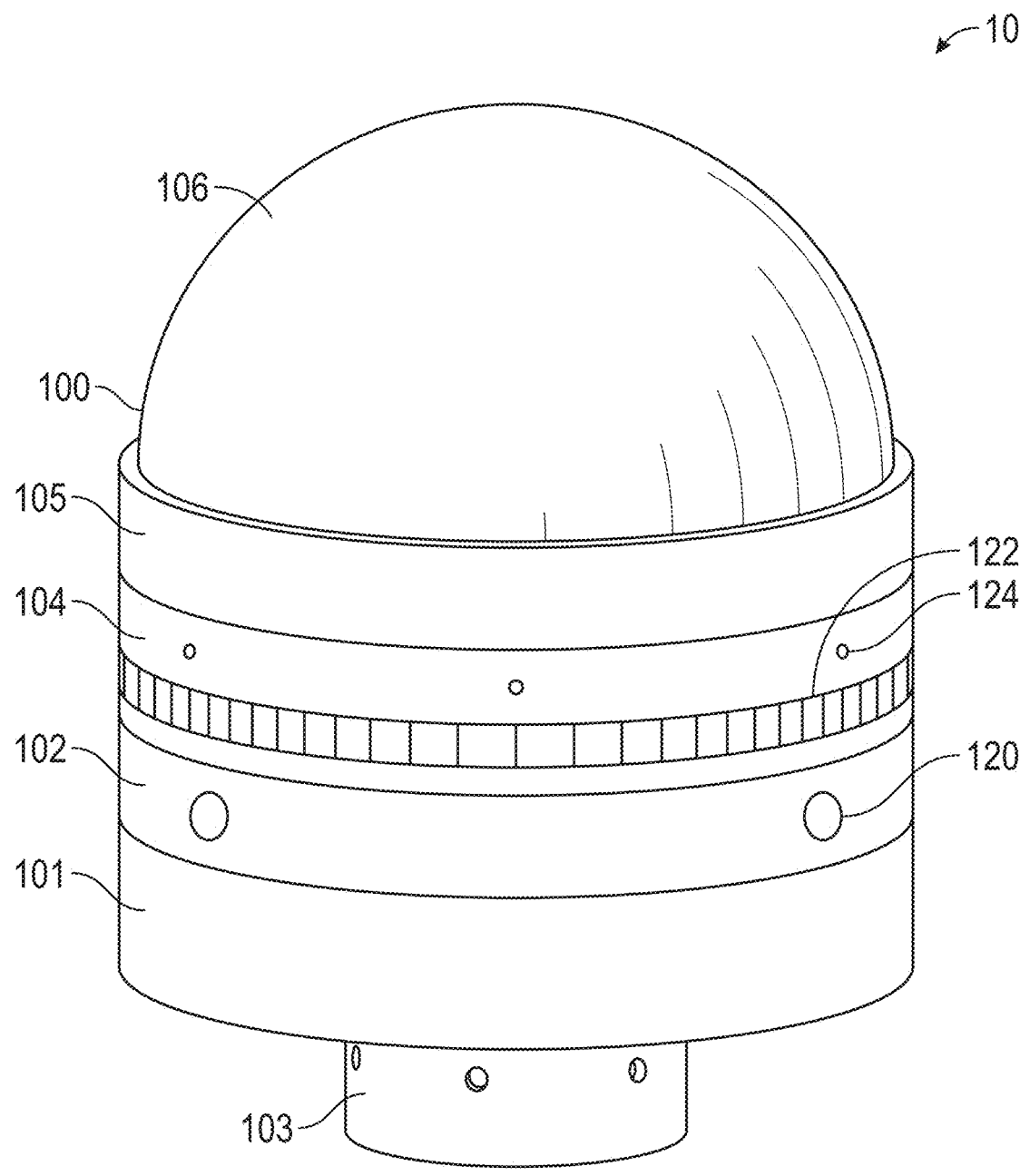
FIG. 1 is a perspective view of a versatile, modular, self-contained, all-weather data collection pod according to one or more embodiments, showing, from top to bottom, a hemispherical dome unit, two optional cylindrical modules, a pod base unit, and a pole mounting bracket.
Figure 2:
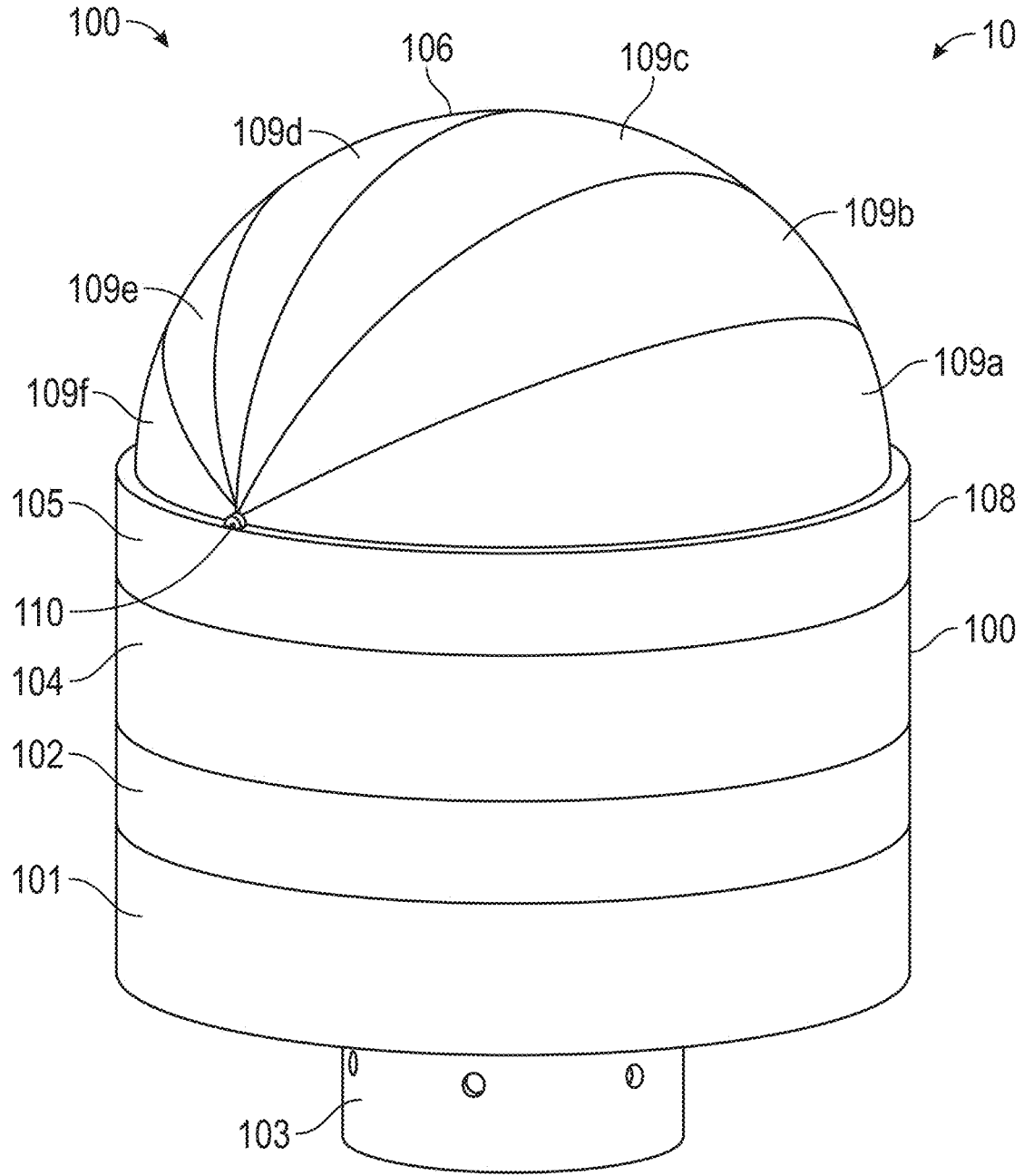
FIG. 2 is a perspective view of the data collection pod of FIG. 1 according to one or more embodiments, where the hemispherical dome unit includes an unmanned aerial vehicle housing and deployment unit with a segmented retractable dome roof.
Figure 3:
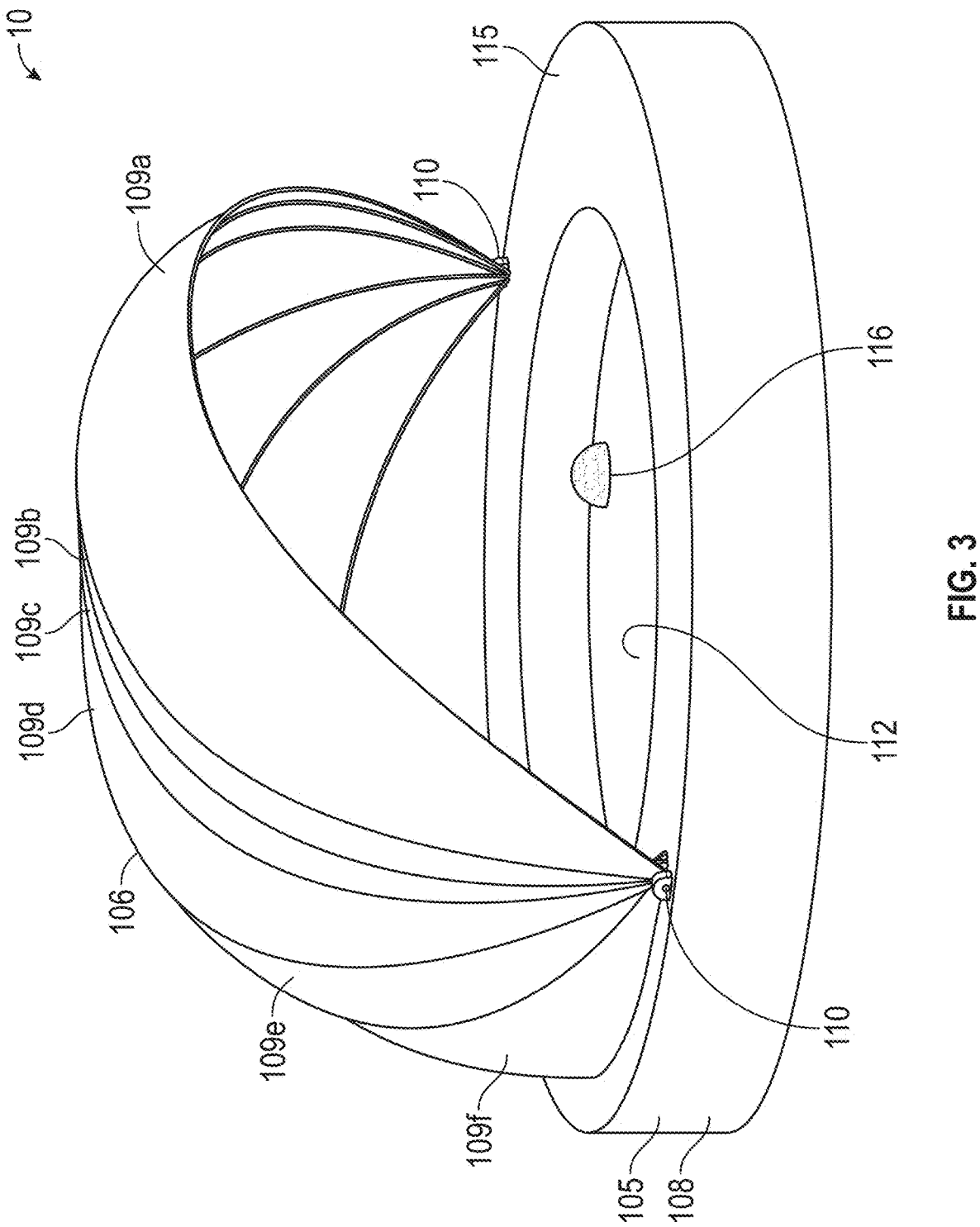
FIG. 3 is perspective view of the unmanned aerial vehicle housing and deployment unit of FIG. 2, shown with the dome roof in a partially retracted state.
Figure 4:
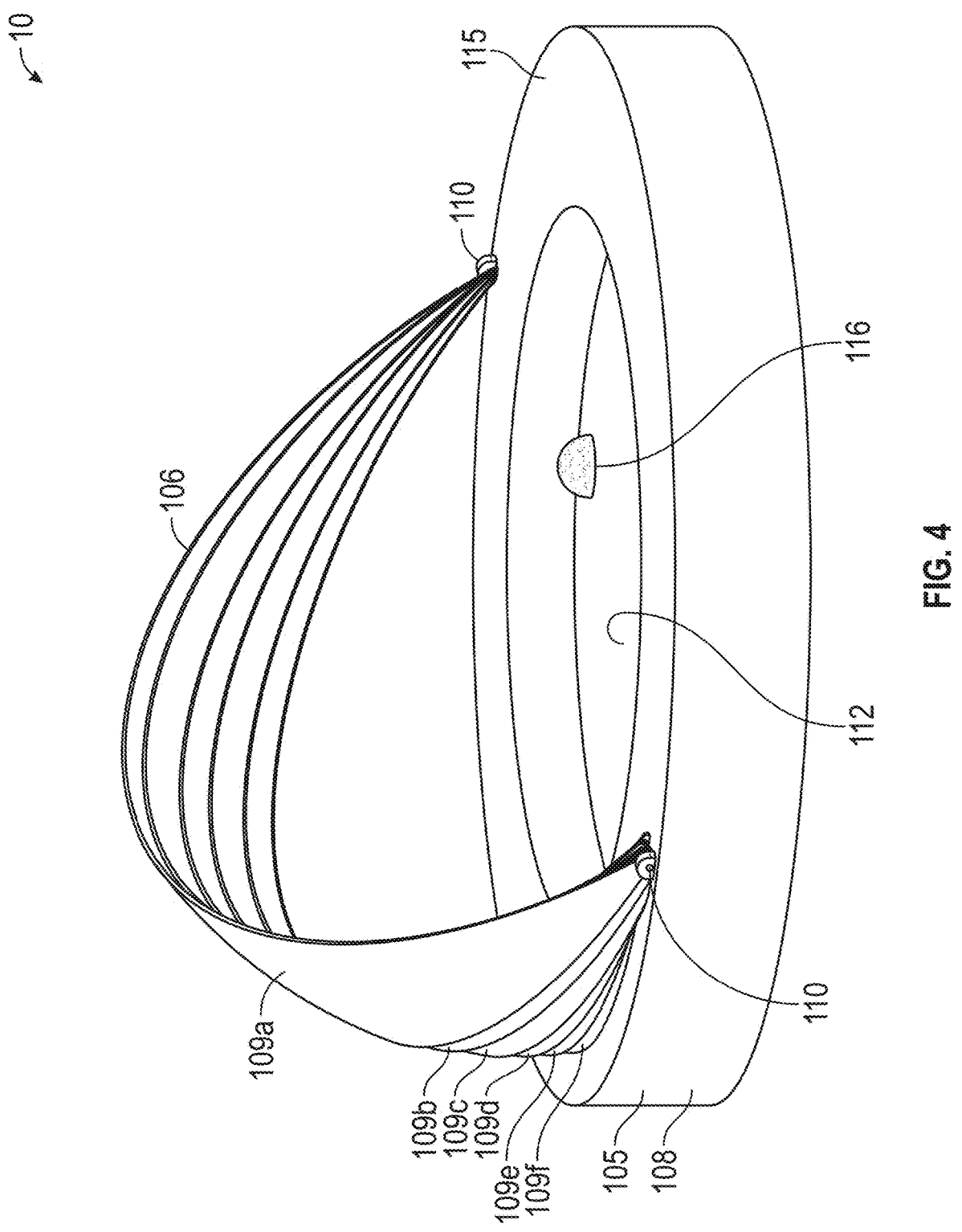
FIG. 4 is perspective view of the unmanned aerial vehicle housing and deployment unit of FIG. 2, shown with the dome roof in a fully retracted state.

Referring now to FIG. 1, in one ore more embodiments, a remote modular data collection system 10 and method are disclosed, which aim to address these present inadequacies by providing a versatile, modular, self-contained and all-weather data collection pod 100 with remote communication with and control capability. Pod 100 may optionally include one or more modules including camera modules, lighting modules, radio communication modules, radar modules, microphone and/or loudspeaker modules, siren modules, weather station modules, power modules, and an unmanned aerial vehicle (UAV) housing and deployment unit, also referred to herein as an unmanned aerial system (UAS). FIG. 1 illustrates two such modules 102, 104 generically, but any number of modules can use used for a particular application. For illustrative purposes only, module 102 of FIG. 1 may be a camera module which includes a number of video cameras 120 about its circumference to provide 360 degree video coverage, and module 104 may be a weather station, which includes a rotative fan anemometer 122 and various static and dynamic pressure ports 124 to measure wind speed and direction and barometric pressure. However, any number and type of modules may be used in lieu of or in addition to camera and weather station modules. The system and method allow modules to be added, removed, upgraded or replaced as necessity dictates, providing for flexible and long-term deployment. As technology advances, other modules not yet conceived may be added.

The system in one or more embodiments includes a pod base unit 101, which includes a computer system with one or more data, control and power busses that is readily extendable to other optional modules. Base unit includes in a protective, weatherproof cylindrical enclosure that is adapted to be universally mounted at its bottom end to utility poles, traffic signals, antenna masts, cell phone towers, ship masts, flagpoles, sign posts, buildings, chimneys, fences, buoys, vehicles, and the like with bolts, screws, or other fasteners. Various mounting brackets 103 or arms may be provided for suitable mounting to a variety of structures, as will be understood by routineers in the art.

In one or more embodiments, the top side of the base unit 101 includes one or more data, control, and or power connectors and a male twist-lock profile for accepting one or more modules, as described in greater detail hereinafter. The bottom end (not illustrated) of pod base unit 101 may include various sensors, ventilation supply and exhaust ports, drainage ports, lights, cameras, mounting bolt hole patterns, and weathertight connectors for optional landline-based power, control and communications connections.

Atop the cylindrical base unit 101, one or more optional cylindrical modules 102, 104 may be affixed, in a stack-like fashion using a quick-connect camlock or bayonet-style system. As discussed in further detail below with respect to FIGS. 10-13, each module has a lower complementary female twist lock profile and one or more data, control, and or power connectors disposed at its bottom side that mate with complementary male twist-lock profile and connectors located on the upper side on the device located below when module is twisted and locked into place. Likewise, each module has a male twist-lock profile and one or more data, control, and or power connectors disposed at its top side that mate with a complementary female twist-lock profile and connectors located on the bottom side on the device located above when that module is twisted and locked into place. In this manner, numerous modules can be stacked like poker chips, with data, control and power busses running up and down throughout the pod.

The topmost portion of pod 100 is terminated with a dome unit 105 which has a convex hemispherical upper surface 106 and a bottom side with female twist lock profile and one or more data, control, and or power connectors disposed thereat. In a preferred embodiment, the hemispherical upper surface includes solar panels, and the dome unit includes circuitry and a battery that is electrically coupled to the power bus for supplying, or at least augmenting, power to the pod. The hemispherical surface serves to maximize the capture of sunlight at all times and provides a streamlined aerodynamic shape.

In one or more embodiments, an onboard battery system consists of a high-capacity lithium-ion polymer battery pack with an integrated battery management system (BMS). The BMS monitors cell voltage, temperature, and charge cycles, and optimizes the charging process, while also preventing overcharging, deep discharge, and temperature-related issues. The BMS transmits this charging and battery data to an onboard computer architecture, discussed hereinafter. The battery system ideally has a capacity of up to 1200 watt-hours, and can deliver power at a consistent rate, depending on load, and is also designed to be modular and easily replaceable.

In one or more embodiments, the integrated solar panels feature high-efficiency monocrystalline silicon photovoltaic cells encapsulated within a scratch-resistant and UV-stable polymer substrate. Electrical interconnections are made using a flexible, copper alloy wiring system designed for repeated flexing, and the surface of the panels are coated with an anti-reflective layer to optimize power generation. The panels are integrated directly into the dome panel(s), creating a seamless and highly efficient system for power generation.

Referring now to FIGS. 2-7, in one or more embodiments, the top dome unit 105 may also serve as a UAV housing and deployment unit 108, which provides a sheltered hangar bay for a UAV. The hemispherical dome 106 of the UAV housing and deployment unit is segmented and serves as a retractable roof to a UAV hangar. FIG. 2-7 illustrate six pivotable arcuate segments 109a-109f that together form dome 106, although any suitable number of segments may be used. All segments 109a-109f share the same two pivot points 110 along a common axis, with each segment having a radius that is slightly larger than its leftmost neighbor, so that when retracted, the six segments are pivotally nestled together in spoon-like fashion.

In other words, the dome top is constructed of multiple independent panels 109a-109f that are connected at a central 110 point via a pivoting hinge mechanism. Each dome panel 109 is attached to the central point 110 using a reinforced hinge and a custom designed articulating joint that allows for smooth rotation and retraction. The panels 109 are connected to a common drive system, driven by a central electric motor, or a pneumatic cylinder, for example These can also be driven by an automated robotic arm. The design of the individual joints allows for a smooth and reliable rotation and allows for the individual panels 109 to move smoothly in a cascading motion. As detailed below with respect to FIGS. 8 and 9, the dome panels 109 are constructed with an extending and lowering lip, designed to create a seal with other dome panels, and to assist in opening and closing of the dome in a cascading effect. Each dome panel 109 is engineered with a uniquely formed extending and lowering lip on opposite sides of the panel edge. As a panel is opened or closed, the extending lip makes contact with the underside of the adjacent panel's lowering lip, creating a secure and watertight seal. The contact points on both sides work together to guide the panel into its proper position. The lip design enables the panels to cascade open and shut, guided by the adjacent panels for a smooth, seamless motion. This interlinked design reduces the required number of components, while also providing a more efficient, secure, and stable structural system.

Figure 5:
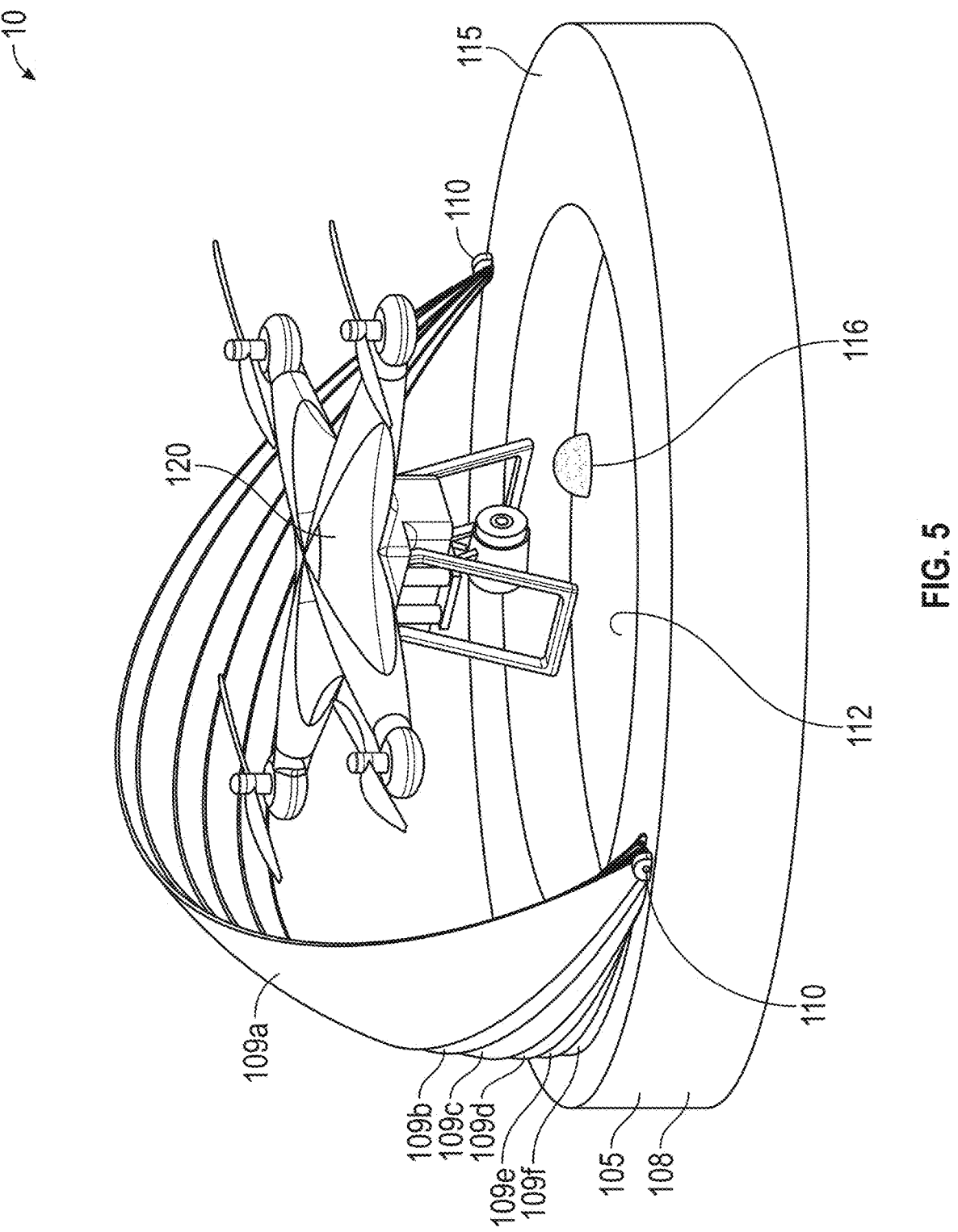
FIG. 5 is a perspective view of the unmanned aerial vehicle housing and deployment unit of FIG. 4, showing a flying unmanned aerial vehicle in the process of a docking or undocking procedure.
Figure 6:
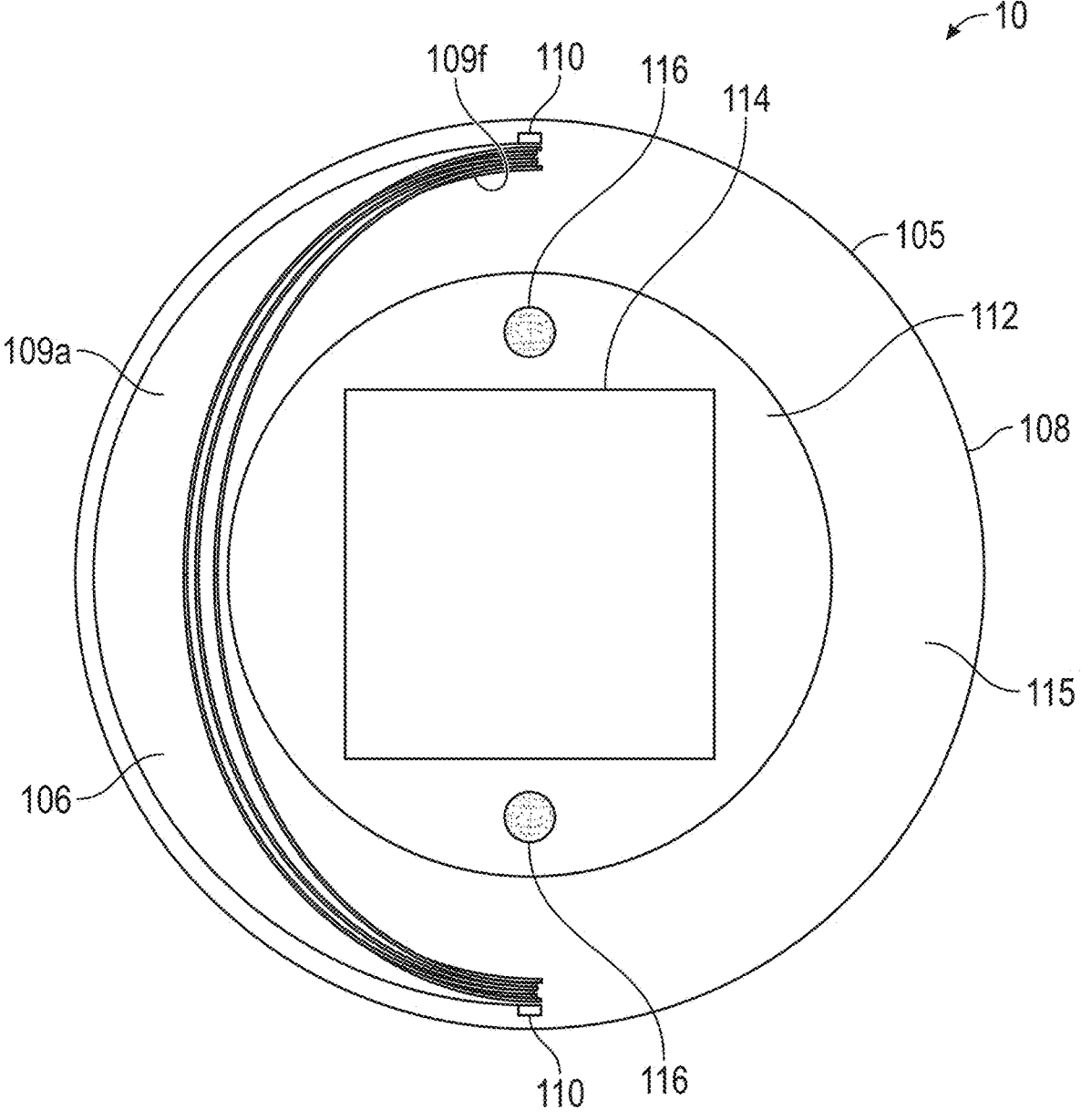
FIG. 6 is a plan view of the unmanned aerial vehicle housing and deployment unit of FIG. 4, showing a landing zone, charging pad, and sensors for docking guidance.
Figure 7:
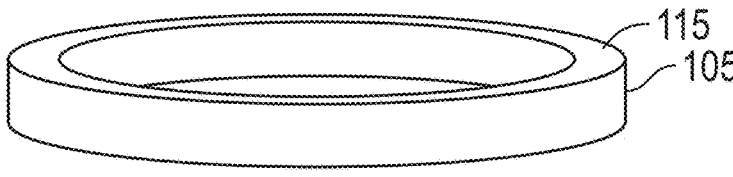
FIG. 7 is an exploded diagram of the unmanned aerial vehicle housing and deployment unit of FIG. 2 according to one or more embodiments.

UAV housing and deployment unit 108 defines a UAV landing zone 112. Proximity and guidance sensors 116 located at or near landing zone 112 may be provided to allow for controlled lift-off and landing of UAV 120 (FIG. 5). Proximity and guidance sensors 116 may be cameras or any other suitable sensor as understood by routineers in the art. As illustrated in FIG. 6, the landing zone 112, upon which UAV 120 sits when not in flight, includes a water-resistant charging pad 114 that electrically or inductively interfaces with the UAV through its landing/support arms to recharge and maintain the UAV batteries in a fully charged state.

In one or more embodiments, the wireless charging process uses a water-resistant inductive pad 114, which utilizes inductive charging principles for highly efficient power transfer. The system incorporates precise alignment sensors 116 and a magnetic connection to correctly position UAV 120 on pad 114 and allows for an efficient charging rate of 200 watts with a charging time of 30 to 90 minutes, depending on the model of the UAV and its battery capacity. Thus, charging pad 114 functions by using electromagnetic fields to charge the UAV battery without an electrically conductive connection. However, conductive charging may also be used as well understood by those of ordinary skill in the art. Charging pad 114 can also use electromagnetic induction to transfer power from a charging pad to another compatible device: The charging pad's transmitter coil sends out an alternating magnetic field; when the recipient device's receiver coil comes into range of the transmitter coil, it receives the transmitted electromagnetic field; and the receiver coil converts the electromagnetic field into an electrical current that charges the device.

The UAV housing and deployment unit 108 includes circuitry and one or more actuators (not illustrated) to selectively open and close the domed hangar roof, and it preferably includes a transceiver and antenna to remotely control UAV 120 in flight, and optionally, to receive telemetry and video feeds from the UAV. However, in some embodiments, telemetry data from UAV 120 may be sent via cellular and/or satellite data communication channels to pod 100 or directly to a remote command center. In one or more embodiments, the UAV control transceiver and/or antenna may be located in a module separate from the UAV housing and deployment unit 108.

Referring to FIG. 5, the roof of UAV housing and deployment unit 108 can be opened and closed remotely via commands from a managing agency or offsite command center. UAV 120 can be deployed to fly pre-programmed flight paths autonomously, identify unsafe flight conditions, perform emergency landings in self-identified safe zones, or return to its home housing. Alternatively, a pilot located at the managing agency or offsite command center may fly UAV remotely as necessary. For instance, nearby UAVs may be used to support law enforcement personnel when conducting traffic stops by approaching vehicles and providing live video stream to the officer prior to the officer approaching the vehicle. Once UAV 120 has landed and powered down, the dome roof of UAV housing and deployment unit 108 may be programmed to close automatically to protect UAV 120 from the elements.

UAV 120 is preferably equipped with a high-resolution thermal camera capable of detecting heat signatures of distressed life forms or other targets. Artificial intelligence (AI) algorithms may be used to analyze the thermal imagery to identify and prioritize targets, minimizing false alarms and ensuring prompt response. Upon identifying a target, UAV 120 can hover near the target to provide continuous monitoring. UAV 120 is programmed to send a live video feed and current GPS location to managing agency or offsite command center as well as to emergency responders, enabling precise georeferencing of the target. The UAV-transmitted real-time video and location data allows accurate and efficient emergency assessment and coordination. Imagery and location data captured by UAV 120 may be locally stored on the UAV and as well as being simultaneously transmitted to emergency responders or command centers.

In one or more embodiments, pod 100 may be programmed to emit a distinct multi-tone whistle sound and activate flashing lights upon UAV deployment and operation. Pod 100 may also sound emergency alerts or play pre-recorded or live messaging to inform nearby individuals of UAV 120 deployment or other critical information. An anti-tampering alarm may be provided to notify the managing agency or offsite command center of unauthorized access or damage.

Figure 8:
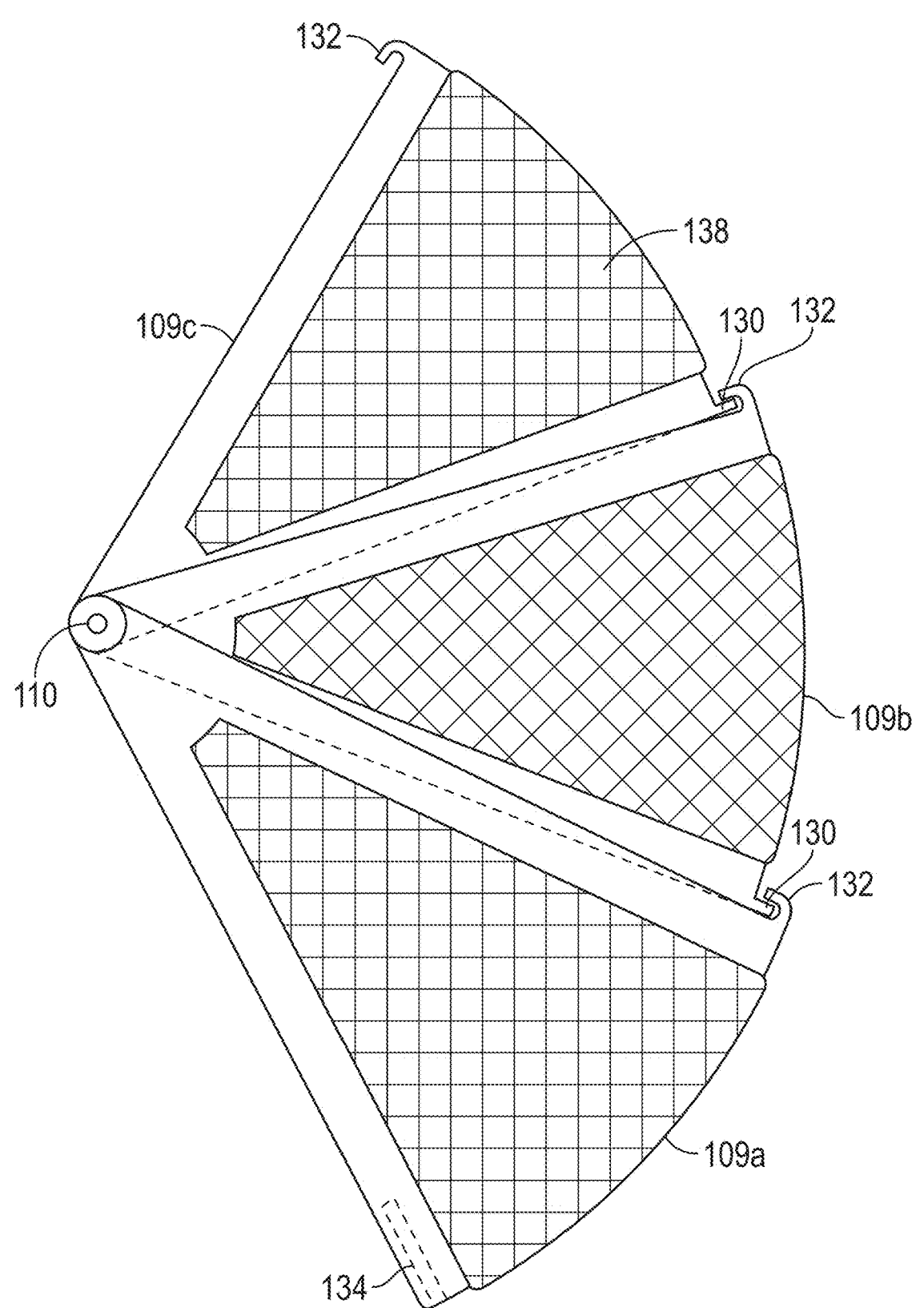
FIG. 8 is an elevation or profile view of exemplary dome panels of the unmanned aerial vehicle housing and deployment unit of FIG. 2 shown in a closed position, according to one or more embodiments.
Figure 9:
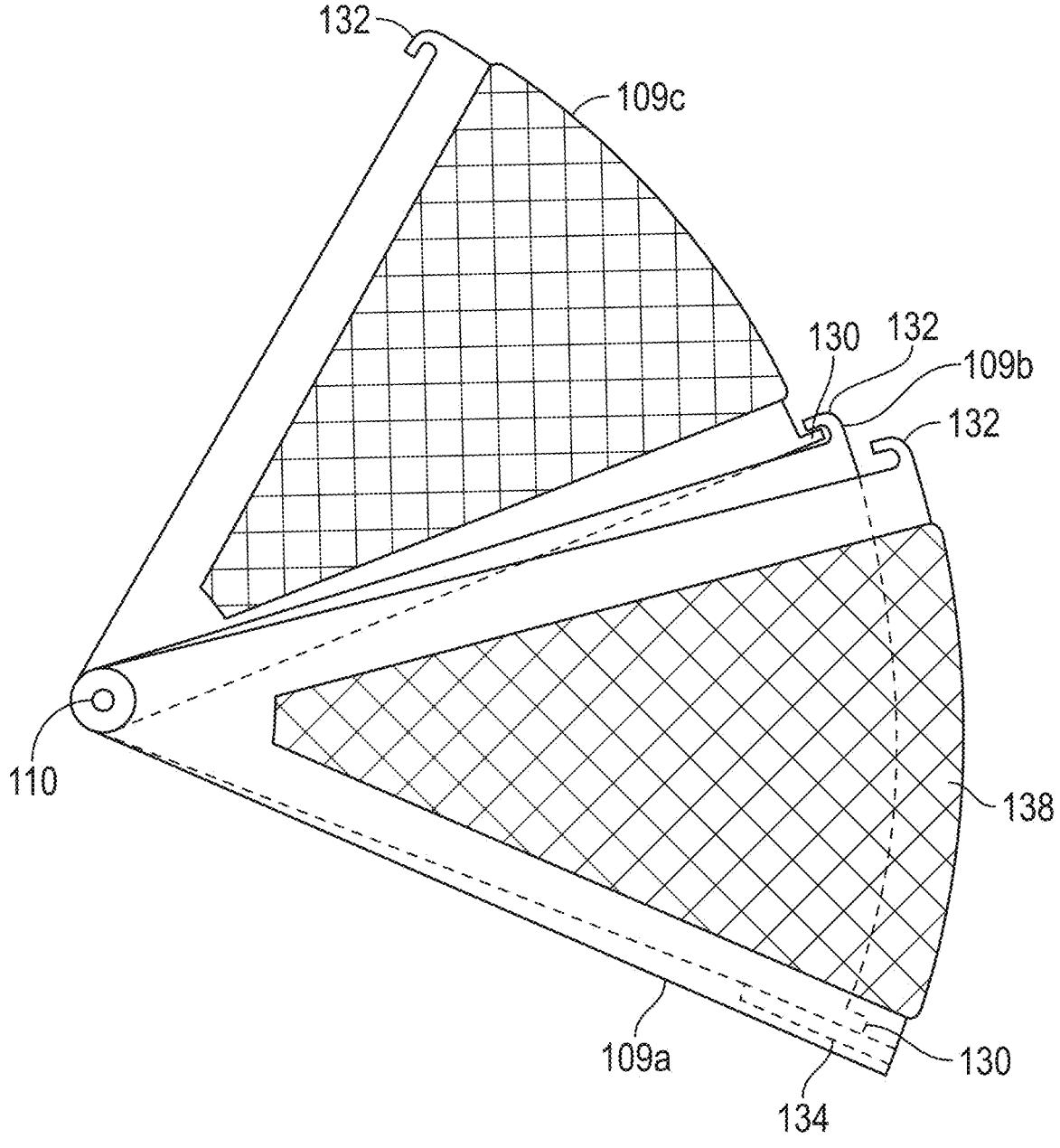
FIG. 9 is an elevation or profile view of the exemplar dome panels of FIG. 9 shown in a partially open position, according to one or more embodiments.

FIGS. 8 and 9 are elevation or profile views of exemplar dome panels 109a-109c of unmanned aerial vehicle housing and deployment unit 108 according to one or more embodiments. The leading edge or lip of each panel 109 (with the exception of the first panel 109a) has an extending tab 130. Similarly, the trailing edge of each panel 109 (with the exception of the last panel 109f (FIG. 7)) has a complementary hook 132. Each tab 130 is captured by the hook 132 of the adjacent panel 109. The leading edge first panel 109a includes an elongate bumper 134 that extends past the radius of the last panel 109f.

To open the dome roof, first panel 109a is pivoted towards the last panel 109f. The radius from pivot point 110 to the tip of hook 132 of panel 109a is greater than the radius from pivot point 110 to the outermost part of panel 109b, thus allowing panel 109a to cover panel 109b. This dimensioning arrangement is similar for all adjacent panels 109. When panel 109a has fully covered panel 109b, as shown in FIG.

9, bumper 134 engages panel 109*b* and pivotally pushes panel 109*b* over panel 109*c*, and so forth down the line until the dome roof is open.

To shut the dome roof, first panel 109*a* is pivoted away from the last panel 109*f*, thus exposing panel 109*b*. When panel 109*a* has fully uncovered panel 109*b*, hook 132 of panel 109*a* engages tab 130 of panel 109*b*, thus pivotally pulling panel 109*b*, and so forth down the line until the dome roof is closed. However, other arrangements for opening and closing the dome roof of UAV housing and deployment unit 108 may be used as will be understood to those skilled in the art.

Referring now to FIGS. 1, 8 and 9, FIGS. 8 and 9 illustrate panels 109 having photovoltaic solar cell material 138 disposed thereon, thus making upper surface 106 of the dome roof dome roof when closed an effective solar panel, able to catch solar energy regardless of the altitude and azimuth of the sun with respect to pod 100. However, photovoltaic solar cell material may be provided atop dome unit 105 even when pod 100 is not equipped with UAV housing and deployment unit 108. In one or more embodiments, photovoltaic solar cell material 138 and batteries (not illustrated) supply all of the power to pod 100, thus allowing for remote installation where utility power is not readily accessible. In other embodiments, pod 100 is connected to a hard-wired source of power, and photovoltaic solar cell material 138 and batteries (not illustrated) provide supplemental and/or redundant back-up power, ensuring reliable operation.

In one or more embodiments, the solar panels integrated into dome roof 106, whether retractable or fixed, feature high-efficiency monocrystalline silicon photovoltaic cells encapsulated within a scratch-resistant and UV-stable polymer substrate. The surface of the panels are coated with an anti-reflective layer to optimize power generation.

In some embodiments, system 10 includes the capability to draw continuous electrical power directly from utility poles by interfacing with the secondary side of a step-down transformer commonly installed on distribution infrastructure. This setup enables the conversion of high-voltage alternating current (AC) from utility lines into low-voltage direct current (DC) through a weatherproof, grid-tied AC-to-DC power supply. The converted power is distributed internally to operate the system's onboard computer, sensors, UAV charging mechanisms, dome actuation motors, and communications equipment. The system optionally includes an integrated battery backup and solar hybrid input for power redundancy. This configuration allows for rapid deployment in urban and industrial environments where grid access is available, supporting autonomous 24/7 monitoring and UAV operations without reliance on off-grid power solutions. Furthermore, excess collected solar energy may be fed back into the electrical grid as an additional source of electrical power to the energy provider.

In one or more embodiments, panels 109 are constructed from carbon fiber or fiberglass reinforced polymers, are attached to central pivoting points 110 by a reinforced hinge and custom designed articulating joints that provide a smooth cascading motion powered by a servo or stepper motor for operation at the hinge. This housing system thus incorporates a unique multi-sectional roll-retracting dome top mechanism, comprising a series of interconnected panels that deploy to form a protective, weatherproof hemisphere, and that are designed to retract tightly into the housing when open. Each panel 109 is also engineered with uniquely formed extending and lowering lips on opposite sides to create a secure and watertight seal. The drive system is a central servo or stepper motor that can be driven by a gear or belt system, with the option for automated deployment through a robotic arm and provides a smooth and reliable opening and closing process. When closed, the multi-section dome 106 provides a seamless and secure weather tight seal to provide complete protection from the elements, and to protect UAV 120 or objects housed within. When open, the panels retract tightly within the base of the housing, reducing the unit's overall profile and creating a unique form factor for portability and storage. Dome 106 is also designed with a unique shape and smooth outer coating, that has been strategically designed to reduce wind resistance, and to allow water to disperse away from the housing and not create areas where it can pool. This unique combination of a multi-sectional design, robust materials, reliable interlocks, automated robotic deployment, and a retractable system creates an innovative solution for a variety of challenging applications, including weatherproofing, space savings, and ease of transportation.

Figure 10:
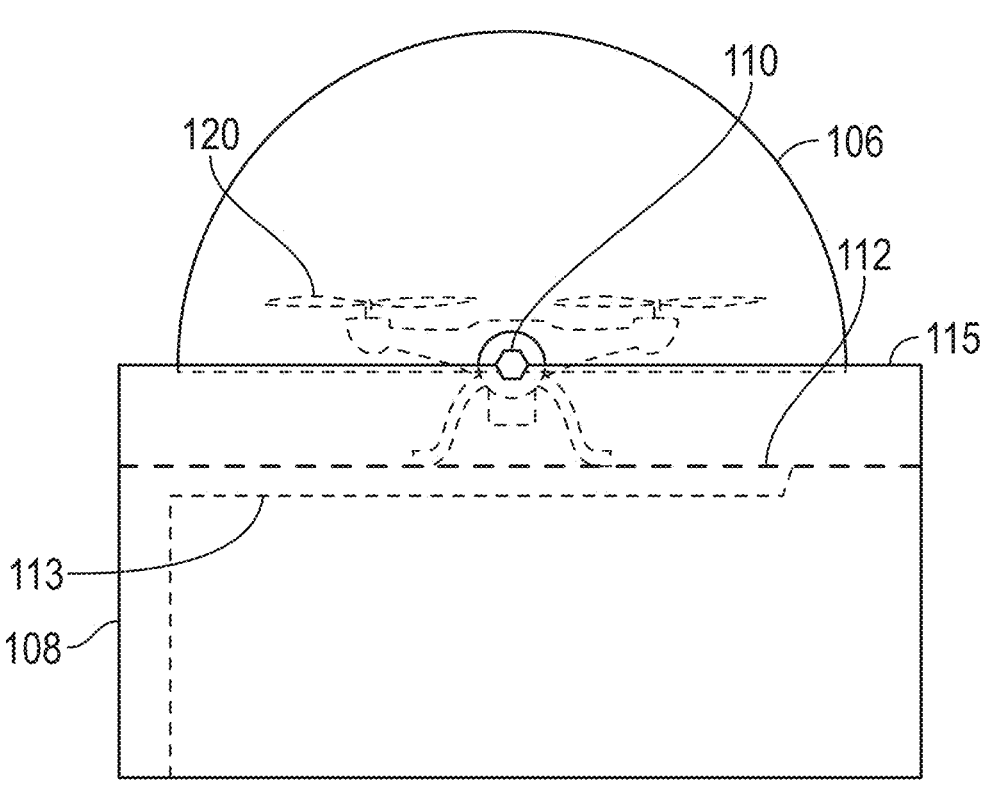
FIG. 10 is an elevation view facing the right-hand side of an unmanned aerial vehicle housing and deployment unit having a unitary retractable dome top according to one or more alternate embodiments, showing a hemispherical dome top in a fully closed position.
Figure 11:
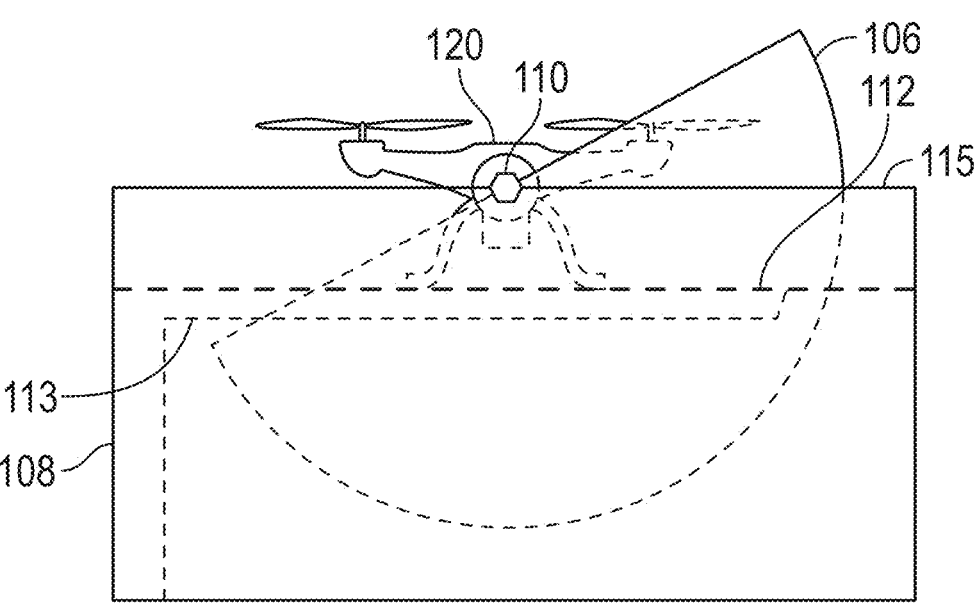
FIG. 11 is an elevation view facing the right-hand side of the unmanned aerial vehicle housing and deployment unit of FIG. 10, showing the dome top in a retracted, fully-open position.
Figure 12:
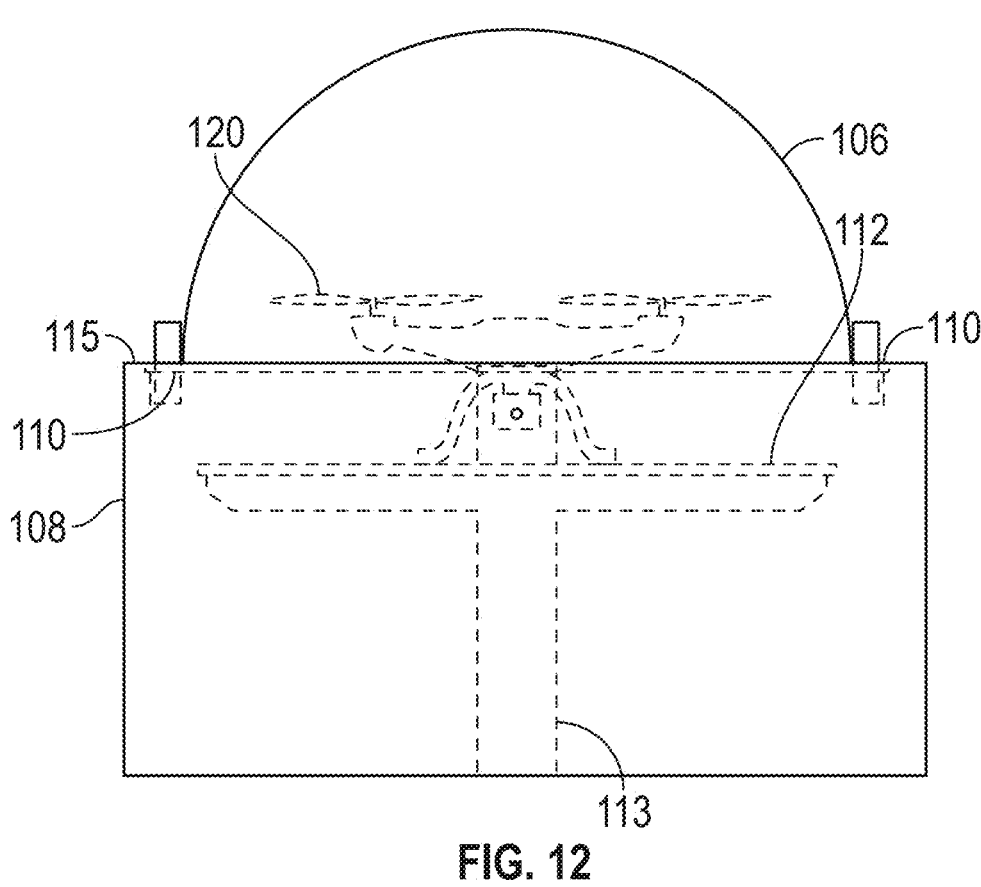
FIG. 12 is an elevation view facing the front side of the unmanned aerial vehicle housing and deployment unit of FIG. 10, showing the dome top in a fully closed position.
Figure 13:
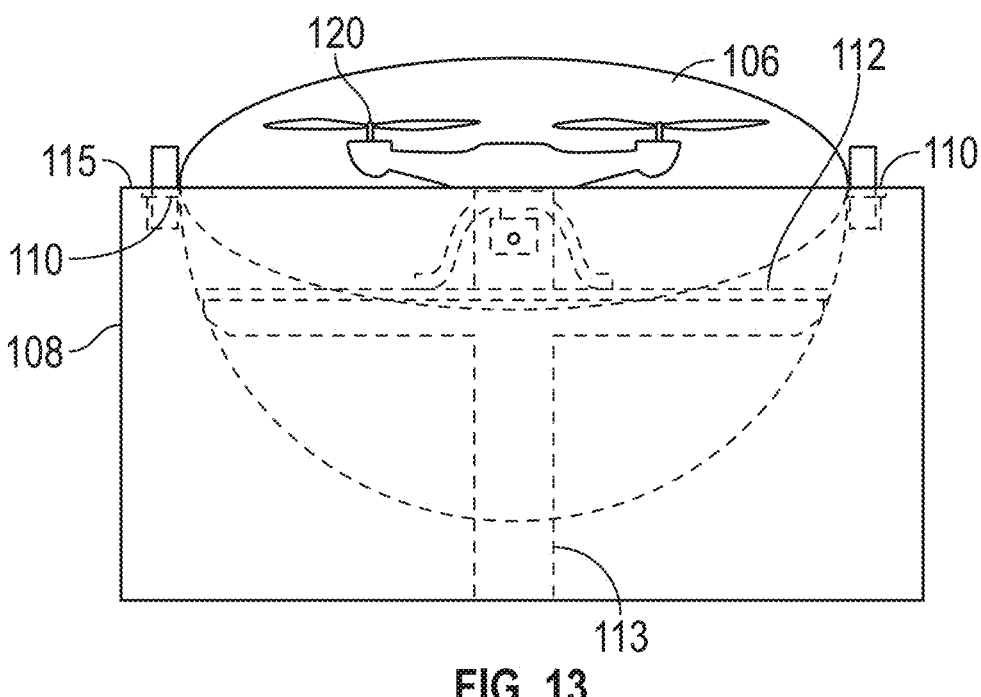
FIG. 13 is an elevation view facing the front side of the unmanned aerial vehicle housing and deployment unit of FIG. 10, showing the dome top in a retracted, fully-open position.
Figure 14:
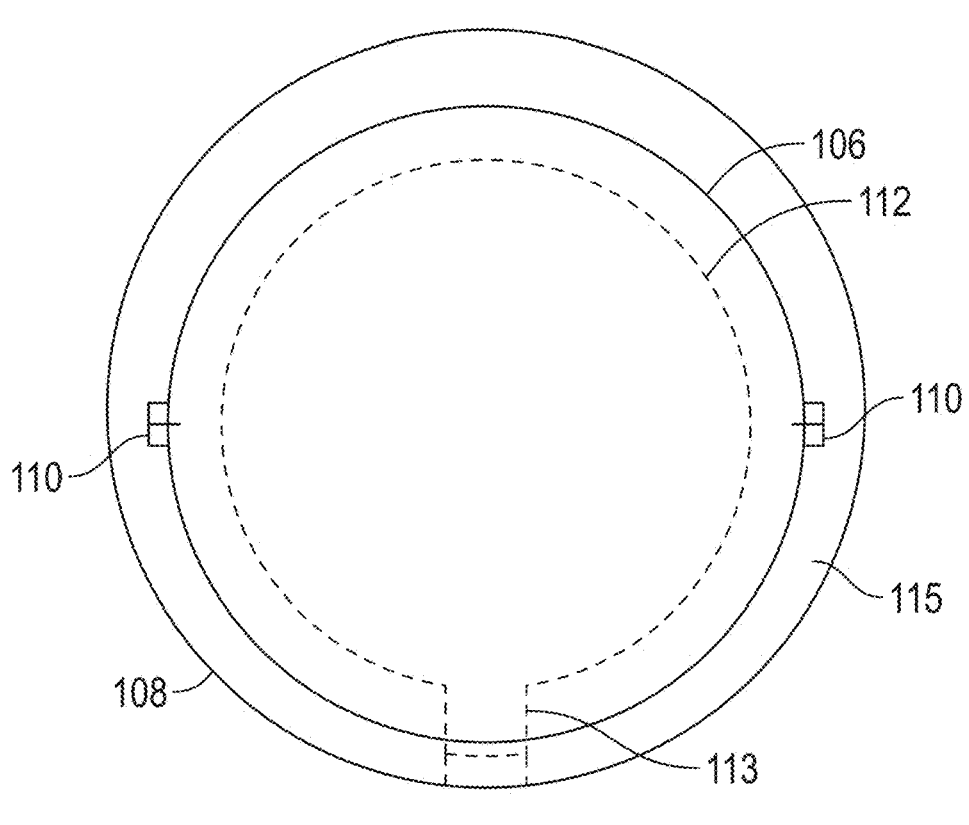
FIG. 14 is a plan view of the top of the unmanned aerial vehicle housing and deployment unit of FIG. 10, showing the dome top in a fully closed position.
Figure 15:
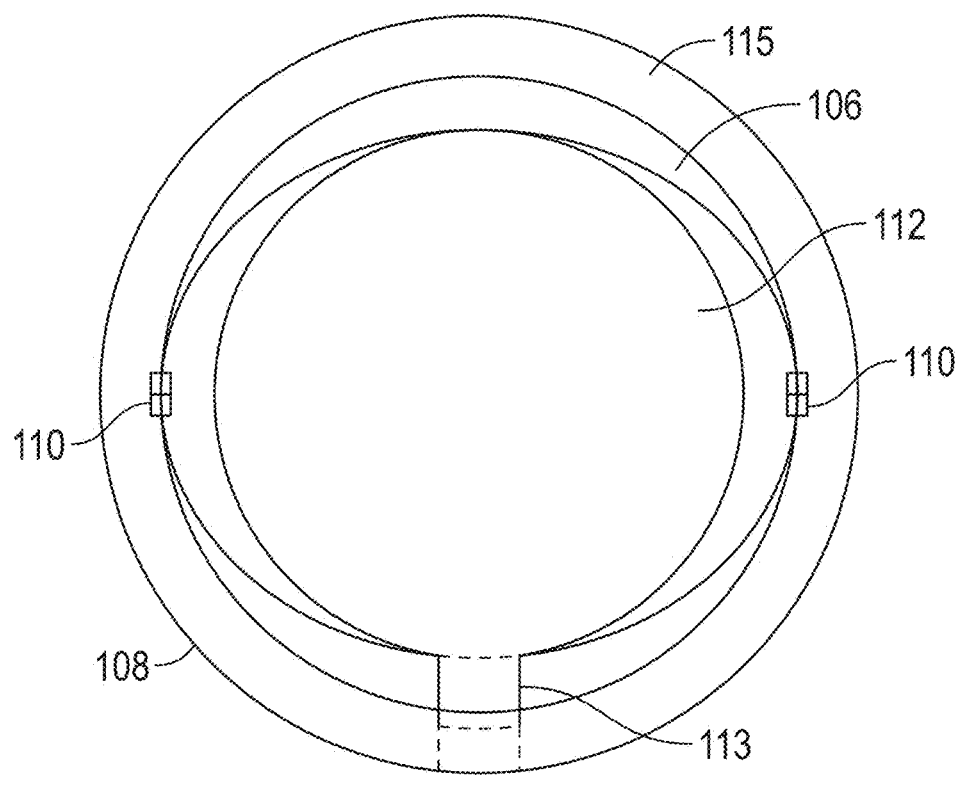
FIG. 15 is a plan view of the top of the unmanned aerial vehicle housing and deployment unit of FIG. 10, showing the dome top in a retracted, fully-open position.
Figure 16:
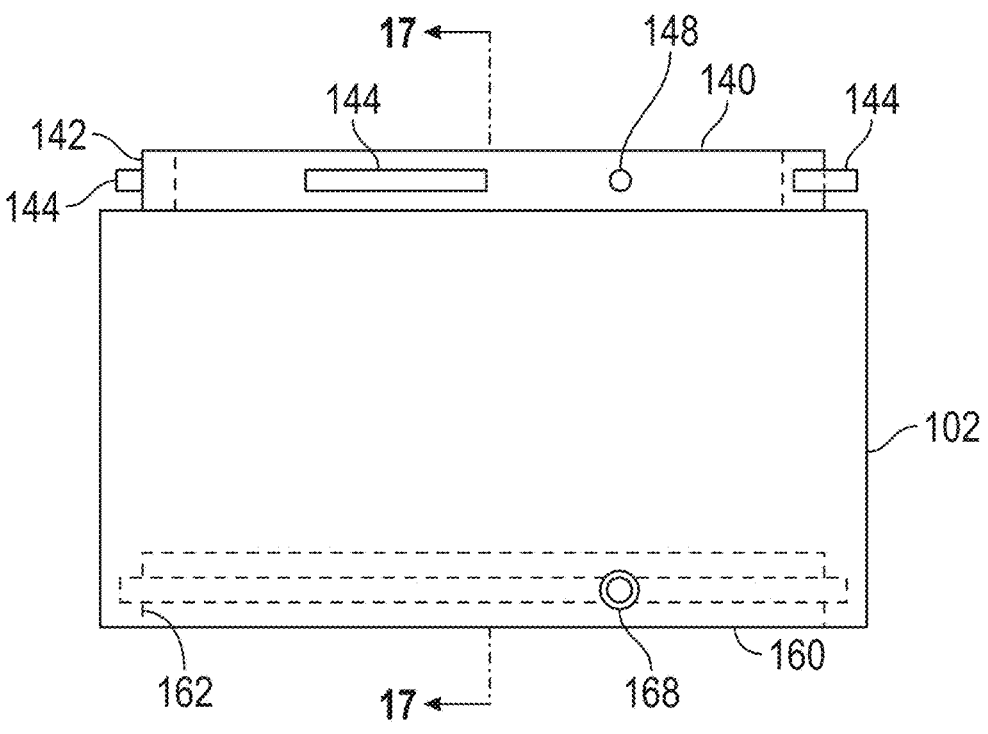
FIG. 16 is an elevation view of a generic module of the data collection pod of FIG. 1, showing a stackable twist-lock arrangement for mating multiple modules together according to one or more embodiments.

FIGS. 10-15 illustrate an unmanned aerial vehicle housing and deployment unit 108 having a unitary retractable dome top according to one or more alternate embodiments. Convex hemispherical dome 106 pivots about two points 110 along a common axis. A motor (not illustrated), such as a stepper or servo motor, is coupled to dome 106, either directly or by belts or gears, near one or both pivot points 110 so as to selectively rotate dome 106 between open and closed positions. FIGS. 10, 12 and 14 show dome 106 in a fully closed position, and FIGS. 11, 13 and 15 show dome 106 in a fully open position. A cantilevered circular UAV landing pad 112 is supported at one narrow region by an 'L'-shaped support arm 113, although other support arm shapes may be used as known by routineers in the art. Cantilevering landing pad 112 allows hemispherical dome 106 to pivot below the landing pad.

As with the unmanned aerial vehicle housing and deployment unit of FIGS. 2-7, the unmanned aerial vehicle housing and deployment unit of FIGS. 10-15 may include proximity, guidance and other sensors, telemetry systems, transponders, a charging pad, solar panels, batteries, and various electronics to support deployment of a UAV as well as pod 100 (FIG. 1), although these devices are not illustrated in FIGS. 10-15 for brevity and clarity.

As illustrated in FIGS. 3-7 and 10-15, the upper circumferential rim of UAV housing and deployment unit 108 features a reinforced and contoured raised edge 115 that surrounds the entire opening of landing zone 112, is designed to act as a structural element that assists in securing dome roof 106, and guides and contains the retractable dome 106 during opening and closing. In addition, this raised section 115 allows protection for all enclosed items by offering a protective surrounding wall to reduce environmental effects, such as wind, from interfering with flight operations. The raised edge 115 is designed with a smooth surface and rounded edges to minimize contact resistance and wear on the dome panels. It provides a secure channel and guide for the outer edge of the dome 106, ensuring a smooth and consistent retraction and deployment.

Although UAV housing and deployment unit 108 has been described herein with both a multi-panel (pivoting along a common axis) and one-piece dome retractable roof configurations, other suitable embodiments may be used for UAV support. For example, a multi-panel clam shell or flower petal arrangement may be used. Alternatively, a retractable tambour-style roof may be used, particularly if a rectangular shape, rather than a cylindrical shape, is used for the housing. Moreover, rather than a retractable roof, a garage door may be used in the side of the UAV housing and deployment unit to provide ingress and egress access to the UAV.

In one or more embodiments, system 10 further includes an integrated defrost mechanism for the retractable dome top, enabling continued operation in cold or icy environments. This mechanism utilizes a network of fine conductive heating elements, such as copper or silver wire, embedded along the inner or outer surface of the dome's material. When activated, the conductive wires generate heat sufficient to melt frost, snow, or ice accumulation, thereby preserving visibility for sensors and cameras and ensuring unobstructed deployment of the unmanned aerial vehicle (UAV). The defrost circuit is controlled via the onboard processor, which may trigger activation autonomously based on ambient temperature, humidity, or ice detection sensors, or through remote manual command. This feature enhances the system's reliability and functionality in subfreezing terrestrial environments and high-altitude applications.

FIGS. 16-19 illustrate the modularity of data collection pod 100 (FIG. 1), wherein one or more optional cylindrical modules may be affixed, in a stack-like fashion using a quick-connect camlock or bayonet-style system. Referring to FIGS. 16-19, a generic module 102 is illustrated. The top 140 of module 102 defines a male camming twist-lock profile. The bottom 160 of module 102 defines complementary female twist-lock profile.

Module top 140 terminates with a circular ring 142 having an outer diameter that forms a slip fit with a circular receptacle 162 within module bottom 160. A number of circumferentially disposed cam keys 144 protrude from ring 142. Likewise, an equal number of recesses 164 with keyway slots 165 are circumferentially formed within receptacle 162. The upper male profile and lower female profile are complementary, so that modules can be readily mated. To attach a module, recesses 164 are rotatively aligned so as to be positioned directly above the cam keys 144 of the module below it. The module being attached is lowered so that ring 142 is received into receptacle 162 and then rotated so that cam keys 144 are slidingly received into keyway slots 165. The upper and lower profiles may be indexed, such by unequal angular positioning or dimensions of keys 144, recesses 174 and keyway slots 165, so that adjacent modules may only be mated in one fixed orientation. Once mated together, a bolt, setscrew, pin or the like (not illustrated) may be installed through holes 148 and 168 to securely lock the two modules together.

Figure 17:
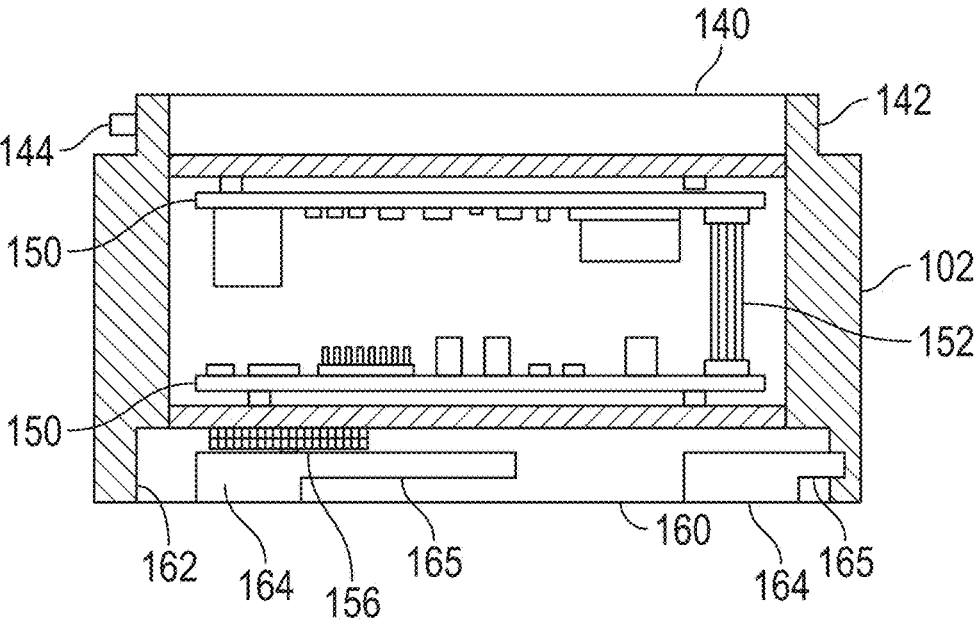
FIG. 17 is a cross-section view of the module of FIG. 16 taken along lines 17-17 of FIG. 16.

Each module 102 includes dedicated circuitry in support of its specialized function, whether it be to operate actuators, cameras, lighting, communications, et cetera. FIG. 17 shows such circuitry on printed circuit boards 150. The circuitry is operatively coupled to a data, control, and power bus 152, which connects all the modules 102 installed in a given pod configuration to pod base unit 101 (FIG. 1). Bus 152 is implemented at module top 140 by a connector 154 that is disposed within ring 142 and at module bottom 160 by a complementary connector 156 that is disposed within receptacle 162. Connectors 154, 156 are disposed so that connector 156 of an upper module 102 connects with connector 154 of a lower module 102 when the upper module is twisted and locked into place. Although a unified data, control, and power bus 152 and connectors 154, 156 are illustrated, multiple independent busses and connection systems may be used as understood by routineers in the art.

Furthermore, although FIGS. 16-19 disclose rigidly mounted connectors 154, 156 for rapidity and simplicity in installing and/or removing modules with a pod, other methods may also be used. For example, data and power buses may be terminated above and below modules with short pigtail connectors, which may be individually connected by hand before modules are mechanically secured together. In this case, ample void space to accommodate the pigtail wires is preferably provided.

Figures 18, 19:
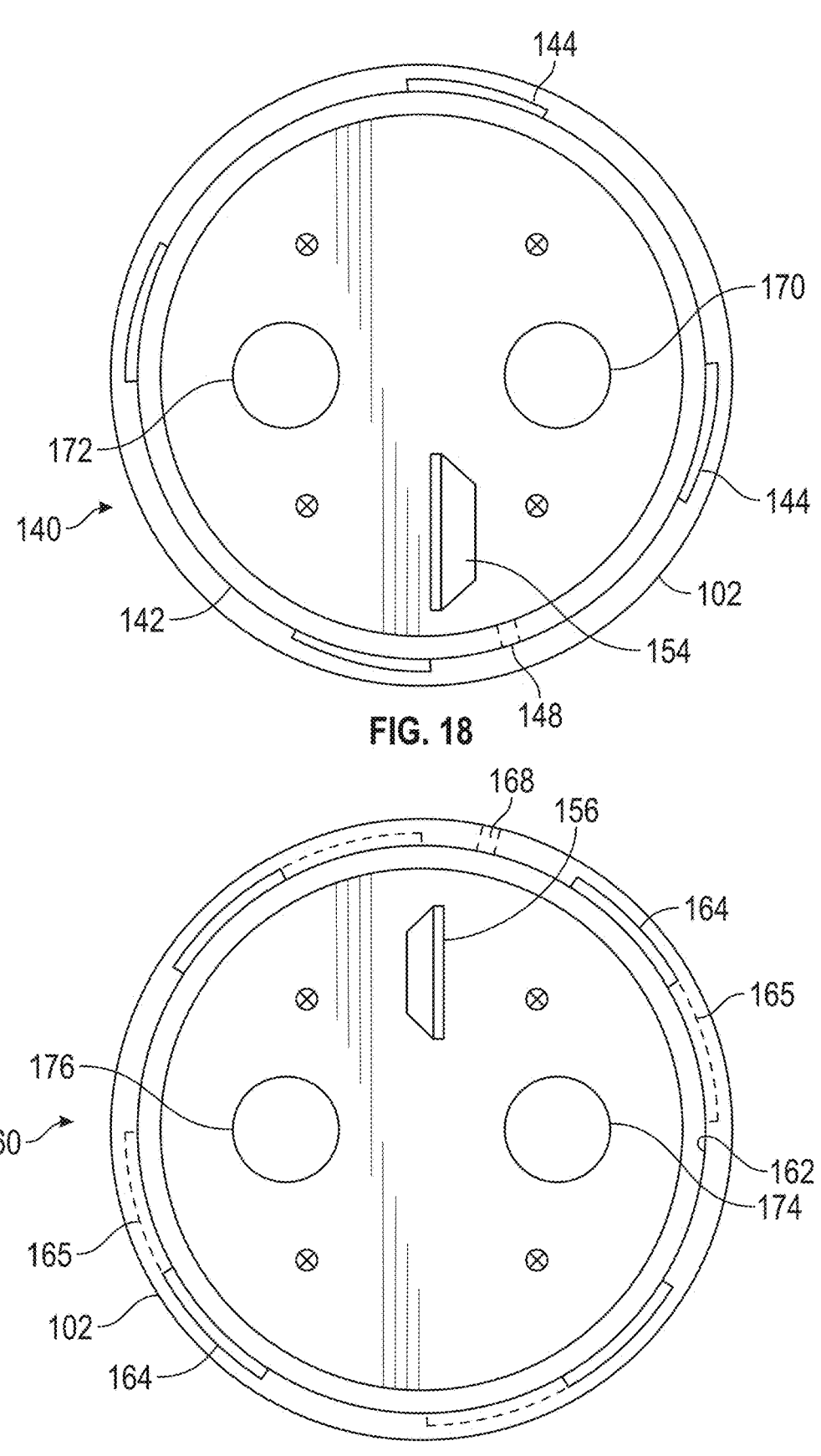
FIG. 18 is a plan view of the top of the module of FIG. 16.
FIG. 19 is a plan view of the bottom of the module of FIG. 16.

FIGS. 18 and 19 illustrate ventilation ports 170, 172 provided in module top 140 and ventilation ports 174, 176 provided in module bottom 160. In one or more embodiments, ports 170 and 174 serve to pass cooling airflow upwards from pod base unit 101 (FIG. 1) through all of the installed modules 102 within a pod 100. Ports 172, and 176 serve to vent exhaust air flow downwards from all of the installed modules 102 within a pod 100. Each module 102 may include baffles, selective ducting, heat sinks, and/or fans (not illustrated) to allow a portion of cooling airflow through module 102 for cooling of electronic components, as known in the art.

Although not illustrated for simplicity, any fluid, such as rain or snow that may be introduced into UAV housing and deployment unit 108 (FIGS. 2-7), particularly when the dome top is open, may be collected within that module and ported to a drain opening at the bottom of the module. Modules below UAV housing and deployment unit 108 may include a funnel-like drain conduit running from top to bottom that catches drainage from the module above and passes it to the module below, where it is eventually released at the bottom of pod base unit 101 (FIG. 1). However, other suitable means for dealing with liquid ingress into pod 100 may be used as appropriate as will be understood by routineers in the art.

Referring back to FIGS. 1 and 2, for terrestrial applications, the data collection pod 100 with a rapidly deployable UAV can detect distressed life forms, relay vital imagery and location data to emergency responders, hover near identified targets to provide georeferenced live feeds and precise GPS locations, and operate autonomously, including safe emergency landings and automatic housing closure. An array or arrangement of multiple pods 100 may be strategically placed at predetermined intervals to ensure comprehensive coverage of an area while keeping UAVs within their operational range. In one or more embodiments, pod 100 is equipped with internet, Wifi, Bluetooth, cellular, satellite and or other radio communication capabilities, through which pods may communicate with UAVs, directly with a remote control station, to nearby pods, or to the remote control station in a bucket brigade fashion via other pods. The use of bucket-brigade communication amongst pods provides flexibility and may reduce the number of dedicated satellite or cellular communication channels needed, as well as provides critical communications redundancy. In one or more arrangements, control of a UAV in flight may pass between pods, being assumed by the nearest pod as the UAV travels. In this manner, an array of pods 100 may be deployed, with only selective pods in the array having UAV housing and deployment unit 108 and onboard UAV 120 (FIG. 5) while providing UAV coverage to an entire area.

In one or more embodiments, the exterior housing of pod 100 is constructed from durable, lightweight materials resistant to corrosion, impact, and environmental elements, such as metal, plastic, fiber materials, or other synthetic materials. For example, pod 100 may be constructed with 6061 or 7075 aluminum alloy or composite for frame components and a polycarbonate or acrylic composite with a protective coating for external panels. However, for military or security uses, such as along the U.S. border, at prisons, or in vandalismprone urban settings, the exterior housing of pod 100 may be constructed from armored material.

In one or more embodiments, the weatherproof enclosure is constructed using a multi-material design approach to achieve a high level of structural integrity and environmental protection. The outer layer consists of a UV-stabilized and impact-resistant polycarbonate or acrylic composite that is molded to create a seamless shell designed to prevent water ingress and protect against harsh weather conditions. The main frame is constructed from a corrosion resistant aluminum alloy, such as 6061 or 7075, which provides a rigid and watertight base. The seams and joints of the housing are sealed with high-grade silicone or Ethylene Propylene Diene Monomer (EPDM) rubber gaskets, that are designed to interlock and overlap, and to create a secure and continuous weather-tight seal. External components may be further enhanced with a high-quality specialized coating that protects against UV damage and temperature changes, as understood in the art. The panels 109 also use custom formed overlaps and joints, that work together with the gasket system to provide added protection against moisture, dust, and other environmental contaminants. The multi-layered construction of the unit provides a redundant system for environmental protection that is both durable, and reliable.

In one or more embodiments, data collection system 10 may include a myriad of sensor types, including environmental monitoring sensors, system status and performance sensors, navigation and positioning sensors, safety and security sensors, and data collection sensors for the UAV, among others.

Environmental monitoring sensors focus on measuring the conditions surrounding the pod: Temperature sensors, such as thermistors, thermocouples, and/or infrared (IR) sensors, may be used to measure ambient temperature, internal pod temperature, and/or component temperatures to ensure safe operating conditions and to monitor power usage and performance; humidity sensors, such as capacitive, resistive, and thermal humidity sensors, may be used to measure moisture levels both inside and outside of the housing to identify potential issues related to condensation, mold or corrosion; barometric pressure sensors, such as piezoresistive and/or capacitive pressure sensors, may be used to measure atmospheric pressure for weather monitoring, altitude calculations, and to determine if there are structural issues with the housing system (such as a breach in pressure sealing); wind speed sensors, such as cup anemometers or ultrasonic anemometers, may be used to measure wind speed to assess local weather conditions and to monitor for unsafe deployment conditions; and precipitation sensors, such as optical or capacitive sensors, may be used to determine the type and volume of precipitation and/or to ensure the pod is sealed and operating properly.

System status and performance sensors monitor the health, performance and operational status of the pod housing and UAS: Voltage and current sensors, such as hall effect sensors and shunt resistors, may be used to measure voltage and current levels of the power system (solar, battery, and charging system) to manage power usage, and ensure safety for all components; battery temperature sensors, such as thermistors or thermocouples integrated into battery packs, may monitor the temperature of the onboard batteries to prevent overheating or overcooling, which may damage the batteries, or other system components; charging pad sensors, which may be hall effect sensors, infrared sensors, and/or pressure sensors, for example, may detect the presence, alignment, and connection status of a UAV for direct or inductive charging; internal pod housing status sensors, such as combination sensors or pressure transducers, may monitor interior conditions for temperature, humidity, and pressure, as well as the security status of the pod housing; vibration sensors, such as piezoelectric sensors or micro-electromechanical systems (MEMS) accelerometers, may sense vibrations and shocks within the system that may indicate component damage or if there are external impacts on the unit; inertial sensors, such MEMS accelerometer- or gyroscope-based inertial measurement units (IMU), may provides data on orientation, acceleration, and movement of the pod for dynamic stability; and light detection and ranging (LIDAR) sensors, such as those using lasers with data processing algorithms, may provide precise information on distance and depth for advanced robotic movement and guidance.

Navigation and positioning sensors provide data on the location and orientation of data collection system 10. A global navigation satellite system (GNSS) receiver, which may be a Global Positioning System (GPS), Galileo, GLONASS, or BeiDou receiver, for example, may provide precise geographic location data for the pod. GPS receivers may be standard receivers or multi-band or wide area augmentation system (WAAS) receivers for enhanced positional data.

Safety and security sensors focus on protecting the system, and the surrounding environment: Tamper sensors, such as proximity, magnetic, or motion sensors, detect unauthorized attempts to open or damage the pod housing; fire and/or smoke sensors, which may include ionization or photoelectric smoke detectors and/or infrared flame detectors, may be used to detect internal or external fire or smoke to activate fire suppression systems and to alert personnel; electromagnetic interference (EMI) sensors, such as antenna based sensors for specific frequency ranges, may detect interference from external electromagnetic sources and may ensure the system is not creating electromagnetic interference with other systems, particularly in space based applications; radiation sensors, such as Geiger-Müller tubes or solid-state radiation sensors, may be employed to detect high levels of radiation, particularly in space applications, to trigger alerts and safety mechanisms and also to monitor internal systems and hardware; chemical, biological, radiological, and nuclear (CBRN) sensors, which is typically a suite of different sensors, including gas sensors, biological sensors, and nuclear radiation sensors, may be provided to detect the presence of chemical, biological, radiological and nuclear agents and provide early warning; and proximity sensors, such as infrared, ultrasonic, or capacitive sensors, may identify objects close to the system and to be used for collision avoidance.

UAV data collection sensors, in addition to providing critical data regarding targets of interest, can often provide key insights about the pod and its immediate surrounding environment: UAVs may include: A high-resolution color visual camera for video feed, visual monitoring, and for object recognition and identification; one or more thermal cameras, such as infrared cameras with different spectral sensitivities, to detect heat signatures of objects or people for search, rescue and monitoring; multi-spectral sensors or hyperspectral imaging systems to collect data across multiple spectral bands to assess plant health, monitor the environment or for other forms of analysis; and acoustic sensors, such as multi directional, high quality, low latency microphones, to capture and transmit sound and audio feeds, providing insight into environmental conditions and identifying sounds related to emergencies or warnings.

Figure 20:
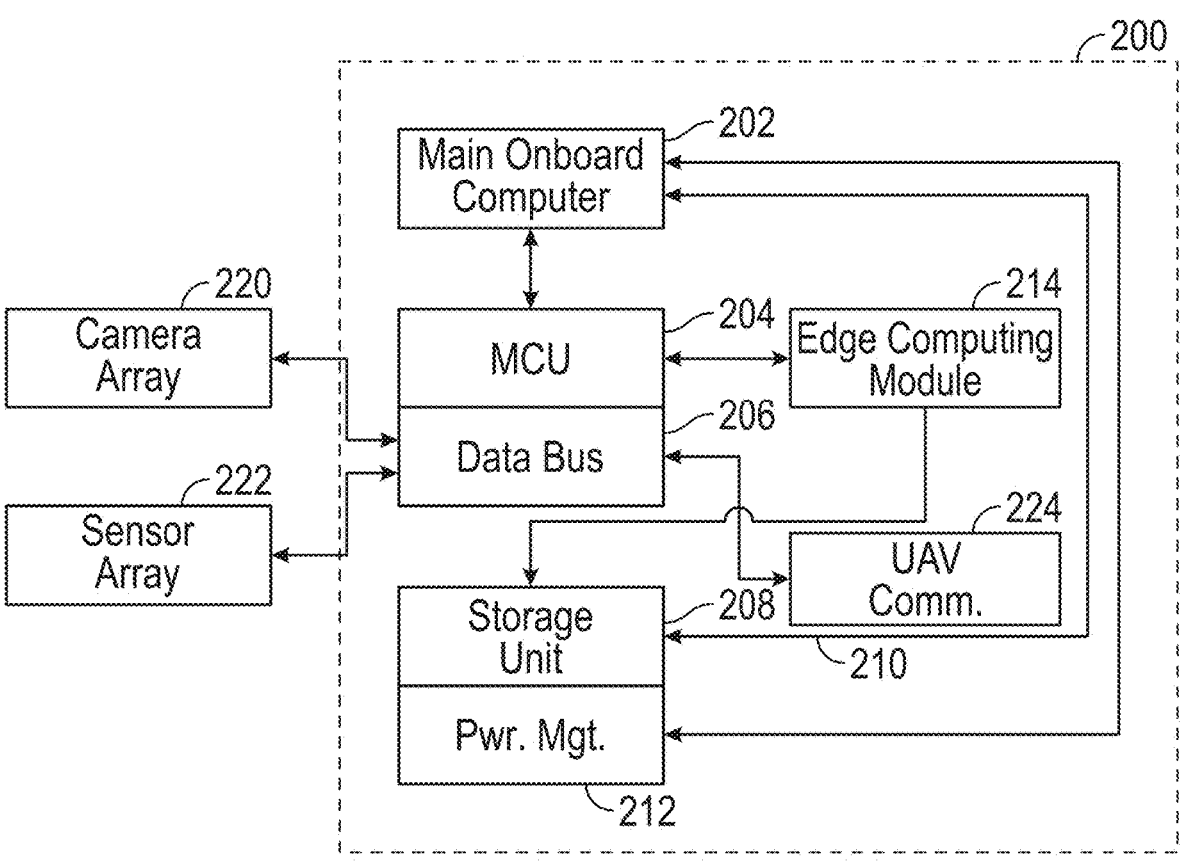
FIG. 20 is a block system diagram for an onboard computer architecture for a data collection system according to one or more embodiments, illustrating key components.

FIG. 20 is a block system diagram for an onboard computer architecture 200 for data collection system 10 according to one or more embodiments, illustrating key components. Computer architecture 200 ideally includes a main onboard computer 202 having a central processing unit the controls and oversees all operations of system 10. Main onboard computer 202 can effectively connect to and manage all cameras, sensors, and the deployable UAV by utilizing the robust, modular computer architecture 200. Main onboard computer 202 may be any suitable commercially available computer. For example, a NVIDIA Jetson AGX Orin or Xavier may be ideal for high-performance computing and AI processing, while a Raspberry Pi CM4 may be suitable for cost-effective, lower-power applications.

Main onboard computer 202 is operably coupled to a master control unit (MCU) 204 for managing data collection and aggregation from all sensors, cameras and the like and for reliably issuing real-time control commands to the same. MCU 204 may be implemented with a STM32F7 Series ARM Cortex M7 Core ARM Microcontroller or a low-cost, low-power system on a chip (SoC) microcontroller such as an ESP32.

Computer architecture 200 includes a data bus 206, which forms the central communication backbone, ideally connecting all peripherals, including cameras, sensors, and the like, of data collection system 10. Data bus 206 may use shielded twisted-pair cabling and employ a Controller Area Network Flexible Data-Rate (CAN FD) protocol Bus or a 1 Gbps Ethernet protocol for reliable, high-speed data transfer and low latency. However, other suitable data communication protocols, either extant or yet to be developed, may be used as understood by routineers in the art. For example, cameras may be coupled to computer architecture 200 via MIPI Camera Serial Interface (CSI) or Universal Serial Bus (USB) 3.0 interfaces for high-resolution video and image data; other sensors may be coupled to computer architecture 200 via Inter-Integrated Circuit (I2C), a full duplex synchronous Serial Peripheral Interface (SPI), or a Universal Asynchronous Receiver/Transmitter (UART), depending on data rate requirements. In some embodiments, multiple data busses may be employed.

Computer architecture 200 also includes a storage unit 208, which ideally has high capacity to enhance data logging operations. Suitable commercial off-the-shelf storage units with fast read/write speeds, such as a Non-Volatile Memory Express (NVMe) solid state drive (SSD) (512 GB or 1 TB), may be employed. Storage unit 208 is ideally operatively coupled to main onboard computer 202 via a Peripheral Component Interconnect Express (PCIe) interface 210 via NVMe protocol, which offers fast data transfer speeds, although a Serial Advanced Technology Attachment (SATA) may also be used.

The data collected by the pod 100 as well as from UAV 120 is stored locally on storage unit 208, to provide a high level of security, and quick access to the data if needed. The data is organized based on type, time, and location for easy access and management. Computer architecture 200 also utilizes onboard AI to classify and prioritize data for more efficient transfer. The system has a built-in automated backup process to prevent loss of any important or mission-critical information, and the data can be accessed remotely by authorized personnel as well as physically accessed by the on-board hard drive.

In one or more embodiments, computer architecture 200 includes a power management module 212 that distributes power efficiently to all pod components. Main onboard computer 202 may be coupled to power management module 212 via an I2C two-wire serial communication protocol as known in the art. Texas Instruments offers a variety of Power Management Integrated Circuits (PMICs) suitable for powering peripheral components in embedded systems. These PMICs often integrate multiple DC-DC converters (buck and boost) and low-dropout regulators (LDOs) to efficiently manage power distribution to the processor, memory, sensors, and other peripheral components. Data collection system 10 may also include various voltage regulators for different components (e.g., 3.3V for sensors, 5V for MCU 204, and 12V for cameras).

An adaptive energy management system utilizes power management module 212 and integrated sensors and algorithms to dynamically switch between multiple power sources. In terrestrial applications, the adaptive energy management system prioritizes the use of solar energy whenever available, actively switching to solar power when sufficient light is detected by light sensors on the dome panels. If solar energy is insufficient, or during periods of darkness, the system seamlessly transitions to a high-capacity onboard battery source, or to an external hard-wired power source, if available. In space applications, the system automatically prioritizes the use of the high-efficiency solar panels, transitioning to a backup battery system when solar input is not available or if there is a system failure. The power switching logic includes an AI driven optimization protocol to maximize power availability while minimizing energy waste, and to ensure that all systems and critical components have an uninterrupted power supply.

In one or more embodiments, computer architecture 200 also includes an edge computing module 214, which provides real-time data processing using AI and machine learning (ML) techniques. Edge computing module 214 is preferably coupled directly to MCU 204 for real-time processing and control. Edge computing module 214 may be implemented using a NVIDIA Jetson Nano for lightweight AI processing or a Google Coral Dev Board for Edge (Tensor Processing Units) TPU acceleration. The Edge TPU is a specialized ASIC (Application-Specific Integrated Circuit) designed by Google for high-performance machine learning inference on low-power devices. It is a component of the Coral platform, which offers various hardware options like the USB Accelerator and Dev Board, enabling local AI processing. The Edge TPU excels at running TensorFlow Lite models efficiently, making it suitable for tasks like image recognition, object detection, and other AI-powered applications on edge devices.

As discussed above, data collection system 10, with its modular design, can have a myriad of various types of sensors. FIG. 20 illustrates how exemplary camera array 220, sensor array 222 and UAV communication module 224 interface with computer architecture 200 via data bus 206. Camera array 220 may include, by way of example, a Sony IMX477 with a MIPI Camera Serial Interface (CSI) interface for high-resolution imaging, a Hanwha Vision Model XNP-C6403R camera with built in AI features, and/or a Forward Looking Infrared FLIR Lepton device for thermal imaging. Camera array 220 includes appropriate circuitry to convert the data from these devices to appropriate protocol, such as CAN FD or Ethernet, employed by data bus 206. Likewise, sensor array 222 may include, for example, a Bosch BME280 sensor to measure environmental temperature, humidity, and pressure parameters and a MPU9250 IMU with gyroscope, accelerometer, and magnetometer. Sensor array 222 includes appropriate circuitry to convert the data from these devices to the protocol employed by data bus 206. UAV communication module 224 may include a NRF24L01 2.4 GHz transceiver for short-range, low-latency communication and/or a MESH Network Module (e.g., Zigbee or LoRa) for extended range communication. Data to and from these components are converted as necessary from appropriate circuitry within UAV communication module 224 to interface with data bus 206. Of course, these are only examples; any number and type of sensors may be interfaced with computer architecture 200, as understood by those of ordinary skill in the art.

Computer architecture 200 necessarily requires software to operate and control data collection system 10, which in one or more embodiments may include a real-time operating system, such as FreeRTOS or Zephyr for MCU 204 to manage real-time tasks like sensor data collection, camera control, and UAV communication. Software may also include NVIDIA JetPack SDK (Ubuntu-based), NVIDIA DeepStream or TensorFlow Lite for AI/ML processing on edge computing module 214, as well as various operating system dependencies and/or drivers, as known to routineers in the art. For UAV communication support, MAVLink (pymavlink and MAVProxy) (for drone communication) and/or LoRa Mesh (including the RadioHead library for mesh networking) software may be used. As known to routineers in the art, other software packages, including custom code, may be used instead of or in addition to the above packages.

Additionally, software may include various scripts for command and control, which may be programmed using any suitable programming language. For instance, the Python programming language may be used in conjunction with the following libraries: NumPy and Pandas for data manipulation and processing, OpenCV for image processing (thermal and visual data), TensorFlow Lite for onboard AI model inference, PySerial, Python-CAN, and Spidev for communication with sensors, and Socket for communication with a satellite modem. For example, the following Python Script on Jetson may be used to collect sensor data from Bosch BME280 sensors and an MPU9250 IMU and log the collected data into a NVMe SSD:

```
import smbus2
import time
import sqlite3
# I2C Address for BME280 and MPU9250
BME280_ADDR = 0x76
MPU9250_ADDR = 0x68
bus = smbus2.SMBus(1)
# Initialize SQLite Database
conn = sqlite3.connect('/mnt/nvme/sensor_data.db')
cursor = conn.cursor( )
cursor.execute('''CREATE TABLE IF NOT EXISTS sensor_data
        (timestamp TEXT, temperature REAL, humidity REAL,
        pressure REAL, accel_x REAL, accel_y REAL, accel_z REAL)''')
def read_bme280( ):
    temp_raw = bus.read_word_data(BME280_ADDR, 0xFA)
    hum_raw = bus.read_word_data(BME280_ADDR, 0xFD)
    pres_raw = bus.read_word_data(BME280_ADDR, 0xF7)
    temp = ((temp_raw / 65536.0) * 165) – 40
    humidity = hum_raw / 65536.0 * 100
    pressure = pres_raw / 65536.0 * 1100
    return temp, humidity, pressure
def read_mpu9250( ):
    accel_x = bus.read_word_data(MPU9250_ADDR, 0x3B) / 16384.0
    accel_y = bus.read_word_data(MPU9250_ADDR, 0x3D) / 16384.0
    accel_z = bus.read_word_data(MPU9250_ADDR, 0x3F) / 16384.0
    return accel_x, accel_y, accel_z
# Main loop for data collection
while True:
    temp, humidity, pressure = read_bme280( )
    accel_x, accel_y, accel_z = read_mpu9250( )
    timestamp = time.strftime('%Y-%m-%d %H:%M:%S')
```

-continued

```
# Insert data into SQLite DB
cursor.execute("INSERT INTO sensor_data VALUES
(?, ?, ?, ?, ?, ?, ?)",
    (timestamp, temp, humidity, pressure, accel_x, accel_y, accel_z))
conn.commit( )
print(f"[{timestamp}] Temp: {temp}°C.,
Humidity: {humidity}%, Pressure:
{pressure}hPa")
time.sleep(2)
```

The following Python Script on Jetson may be used to capture images from Sony IMX477 cameras and process them using OpenCV and TensorFlow Lite:

```
import cv2
import tflite_runtime.interpreter as tflite
import numpy as np
import time
# Load TFLite model for image processing
interpreter = tflite.Interpreter(model_path="model.tflite")
interpreter.allocate_tensors( )
input_details = interpreter.get_input_details( )
output_details = interpreter.get_output_details( )
# Initialize cameras
camera_1 = cv2.VideoCapture(0)
camera_2 = cv2.VideoCapture(1)
def process_frame(frame):
    resized_frame = cv2.resize(frame, (224, 224))
    input_data = np.expand_dims(resized_frame,
    axis=0).astype(np.float32)
    interpreter.set_tensor(input_details[0]['index'], input_data)
    interpreter.invoke( )
    output_data = interpreter.get_tensor(output_details[0]['index'])
    return output_data
while True:
    ret1, frame1 = camera_1.read( )
    ret2, frame2 = camera_2.read( )
    if ret1 and ret2:
        processed_data_1 = process_frame(frame1)
        processed_data_2 = process_frame(frame2)
        cv2.imshow('Camera 1', frame1)
        cv2.imshow('Camera 2', frame2)
        # Save processed images
        cv2.imwrite(f'/mnt/nvme/cam1_{time.time( )}.jpg', frame1)
        cv2.imwrite(f'/mnt/nvme/cam2_{time.time( )}.jpg', frame2)
        # Display processed data
        print(f"Processed Data Camera 1: {processed_data_1}")
        print(f"Processed Data Camera 2: {processed_data_2}")
        if cv2.waitKey(1) & 0xFF == ord('q'):
            break
camera_1.release( )
camera_2.release( )
cv2.destroyAllWindows( )
```

The following Python Script uses MAVLink to communicate commands to a UAV via a UART:

```
from pymavlink import mavutil
# Establish connection with the internal drone
drone = mavutil.mavlink_connection('/dev/ttyUSB0', baud=115200)
drone.wait_heartbeat( )
# Arm the drone
drone.mav.command_long_send(
    drone.target_system,
    drone.target_component,
    mavutil.mavlink.MAV_CMD_COMPONENT_ARM_DISARM,
    0,
    1, 0, 0, 0, 0, 0, 0
)
print("Drone armed")
# Takeoff to 10 meters
drone.mav.command_long_send(
    drone.target_system,
    drone.target_component,
```

-continued

```
mavutil.mavlink.MAV_CMD_NAV_TAKEOFF,
0,
0, 0, 0, 0, 0, 0, 10
)
print("Takeoff command sent")
```

The following script may be used for seismic anomaly detection:

```
import numpy as np
THRESHOLD = 3.0
def detect_anomaly(data):
    mean = np.mean(data)
    std_dev = np.std(data)
    anomalies = [x for x in data if abs(x –
    mean) > THRESHOLD * std_dev]
    return anomalies
seismic_data = [0.05, 0.06, 0.07, 4.5, 0.08, 0.09]
anomalies = detect_anomaly(seismic_data)
if anomalies:
    print(f"Anomalies Detected: {anomalies}")
```

And finally, an exemplary script for satellite communication using a RockBLOCK 9603 Satellite Modem connected via a UART to a NVIDIA Jetson AGX Orin is listed below:

```
import serial
from Crypto.Cipher import AES
import base64
ser = serial.Serial('/dev/ttyUSB0', baudrate=19200, timeout=1)
encryption_key = b'Sixteen byte key'
cipher = AES.new(encryption_key, AES.MODE_EAX)
def send_data(data):
    nonce = cipher.nonce
    ciphertext, tag = cipher.encrypt_and_digest(data.encode('utf-8'))
    payload = base64.b64encode(nonce + ciphertext).decode('utf-8')
    ser.write(f'AT+SBDWT={payload}\r'.encode( ))
    ser.write(b'AT+SBDIX\r')
    response = ser.read(100)
    print(f"Satellite Response: {response}")
send_data("Test transmission")
```

Figure 21:
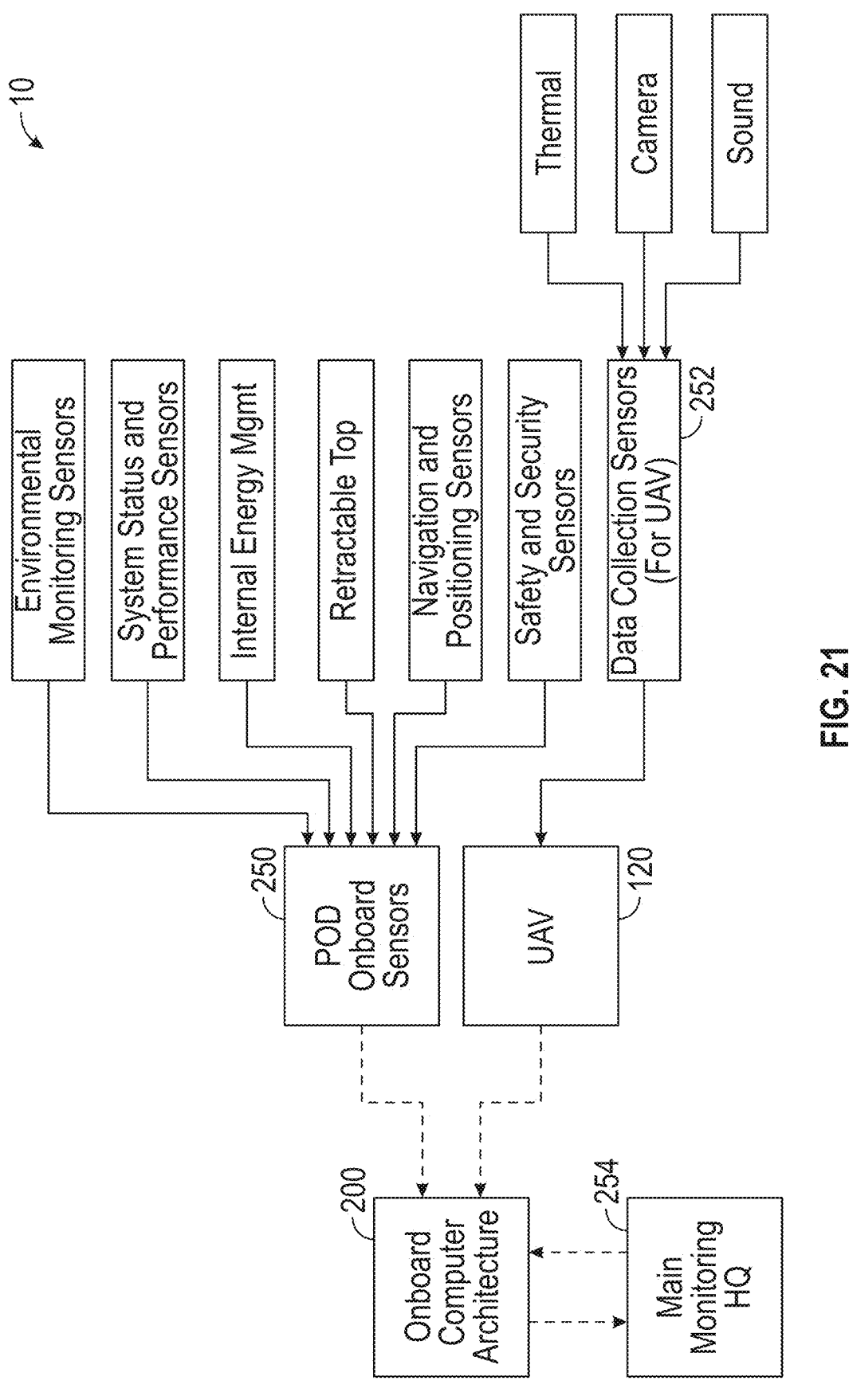
FIG. 21 is a block diagram of a data collection system including the onboard computer architecture of FIG. 20, that is implementable with the data collection pod of FIGS. 1-19, according to one or more embodiments.

FIG. 21 is a block diagram of an embodiment of data collection system 10 for a given pod 100 (FIG. 1). Onboard computer architecture 200 controls and receives data from various pod sensors 250, which may be any of the type disclosed above or others not mentioned herein. Onboard computer architecture 200 is operatively coupled to sensors 250 as described above or by suitable methods as known to skilled artisans. As illustrated in FIG. 21, sensors 250 may include environmental monitoring sensors, system status and performance sensors, internal energy management sensors, retractable dome top sensors, navigation and positioning sensors, and safety and security sensors. Onboard computer architecture 200 also controls and receives data from UAV 120 and its various sensors 252, which may include, by way of example, thermal, camera, and sound sensors.

Onboard computer architecture 200 is preferably communicatively coupled to a remote main monitoring headquarters or control station 254, which may be operated by emergency services, law enforcement, military, or other agencies or organizations, for example. In one or more embodiments, data collected by onboard computer architecture 200 is preprocessed prior to transmission to remote station 254, thereby reducing the data processing required at remote station 254, which may be monitoring numerous individual data collection pods. Accordingly, computer architecture 200 is ideally equipped with AI and ML capabilities, as described above. In other embodiments, perhaps due to power or cost concerns, data preprocessing by computer architecture 200 is minimal, and raw data is transmitted to remote station 254 where the bulk of data processing and analysis takes place.

System 10 utilizes a modular communication architecture that supports internet, Bluetooth, cellular, and satellite communication protocols, ensuring connectivity in a wide range of operational environments. When available, the system will prioritize internet-based communications. If internet is not available, the system switches to a cellular connection. In remote areas where cellular connections are unavailable, or unreliable, a satellite communications link provides an additional failsafe for remote operations. Each communication protocol is encrypted using advanced encryption standards, including AES-256, to ensure secure and reliable data transmission, and to mitigate the risk of data breaches, or unauthorized access. The system is also capable of simultaneous transmission across multiple channels to ensure both low latency, and full data transmission integrity.

Figure 22:
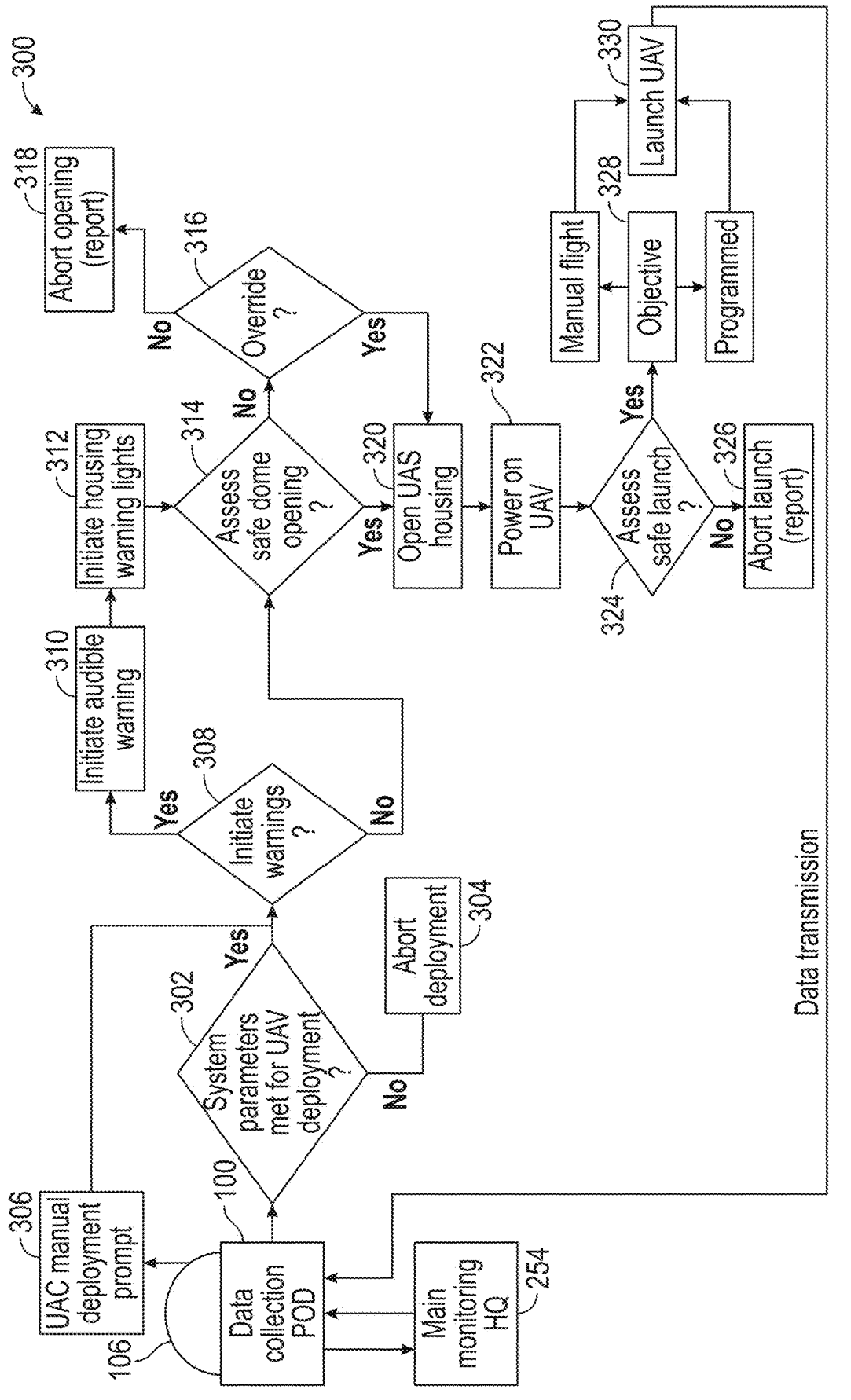
FIG. 22 is a flow chart diagram of a method for launching an unmanned aerial vehicle by the data collection system of FIG. 21, according to one or more embodiments.

FIG. 22 is a flow chart diagram of a method 300, according to one or more embodiments, for launching UAV 120 by data collection pod 100. Referring to FIGS. 21 and 22, when data collection pod 100 receives or processes a request for UAV launch, whether an automated request as a result of local sensor readings or a request originating from main monitoring headquarters 254, at decision block 302, various system parameters are reviewed to determine whether UAV may be safely deployed. System 10 identifies unsafe flight conditions through a multi-layered approach. External parameter sensors, including an anemometer, thermometer, barometer, and humidity sensor, collect real-time weather data. This data is processed by an integrated AI algorithm, which checks for predefined safety limits for parameters such as wind speed, temperature, atmospheric pressure, and moisture levels. In addition to weather data, system 10 also monitors for internal system parameters, such as low battery voltage, low communication signals, internal temperature, and GPS signal quality, and compares them against safe operating standards. Additionally, local air traffic control may be queried for clearance and advisory information, particularly in congested airspace. If any of these parameters, whether external or internal, are outside of established tolerances, system 10 will, at step 304, abort the UAV flight. However, at step 306, UAV flight may be manually deployed, overriding decision block 302, which may be used in emergent situations.

If flight conditions are deemed satisfactory per decision block 302, method 300 entails determining whether pre-launch warnings should be initiated at decision block 308. Such decision may be based on preset parameters, such as whether persons are detected near data collection pod 100 (as may be detected by local cameras), the time of day, location, and whether clandestine operation is desired. If warnings are appropriate, at steps 310 and 312, audible warnings, sirens, and/or lights are enabled. If warnings are inappropriate, method 300 proceeds without audible and/or visual notification. At decision block 314, it is determined whether it is safe to open dome roof 106. This decision may take into account determination of hard precipitation, using environmental, audio and/or seismic sensors, high winds, and/or various system health sensors, as well as external data.

The dome roof 106 may be opened remotely via secure, encrypted commands transmitted from the managing agency or space command center 254. The command signal activates an internal receiver which interprets the signal to initiate a power cycle that will activate a servo or stepper motor to initiate the opening process of dome 106. The receiver authenticates the command, and engages the system, preventing any unauthorized attempts. Pod 100 ideally has a backup mechanical activation mechanism for override, if needed.

If at decision block 314 it is determined to be unsafe to open dome roof 106, method 300 provides an override feature a decision block 316 for emergent situations. If not overridden by manual operator input, at step 318, roof opening is aborted and a report is logged. If overridden at block 316, or if it was deemed safe to open dome roof 106 at block 316, at step 320 the dome roof of the UAS is opened.

After the UAS roof is opened, at step 322 UAV 120 is powered and initialized, and preflight self-diagnostics are run. At decision block 324, the determination of whether UAV 120 may be safely launched, in view of UAV preflight checks, is made. If safe flight is not possible, at step 326 launch is aborted and a report is logged. Otherwise, at step 328, depending on the flight objectives, operational parameters and configurations are set-manual flight control or preprogrammed flight path. The pre-programmed flight path delivery mechanism utilizes an integrated flight controller equipped with GPS, inertial measurement unit (IMU), and an onboard mapping system. The integrated flight controller accesses stored flight plan data specific to that location and mission. The flight path can be uploaded remotely or selected from a list of common operational protocols. The flight controller autonomously takes control of the UAS and initiates the flight plan, using GPS for accurate positioning, inertial sensors for stabilization, and its onboard mapping system to monitor its course. At step 330, UAV 120 is launched, and it transmits data to computer architecture 200 during its flight. During the flight, the system continuously monitors its position and data points, making small course corrections as needed. The flight path is executed autonomously but is also monitored remotely by a command center.

Figure 23:
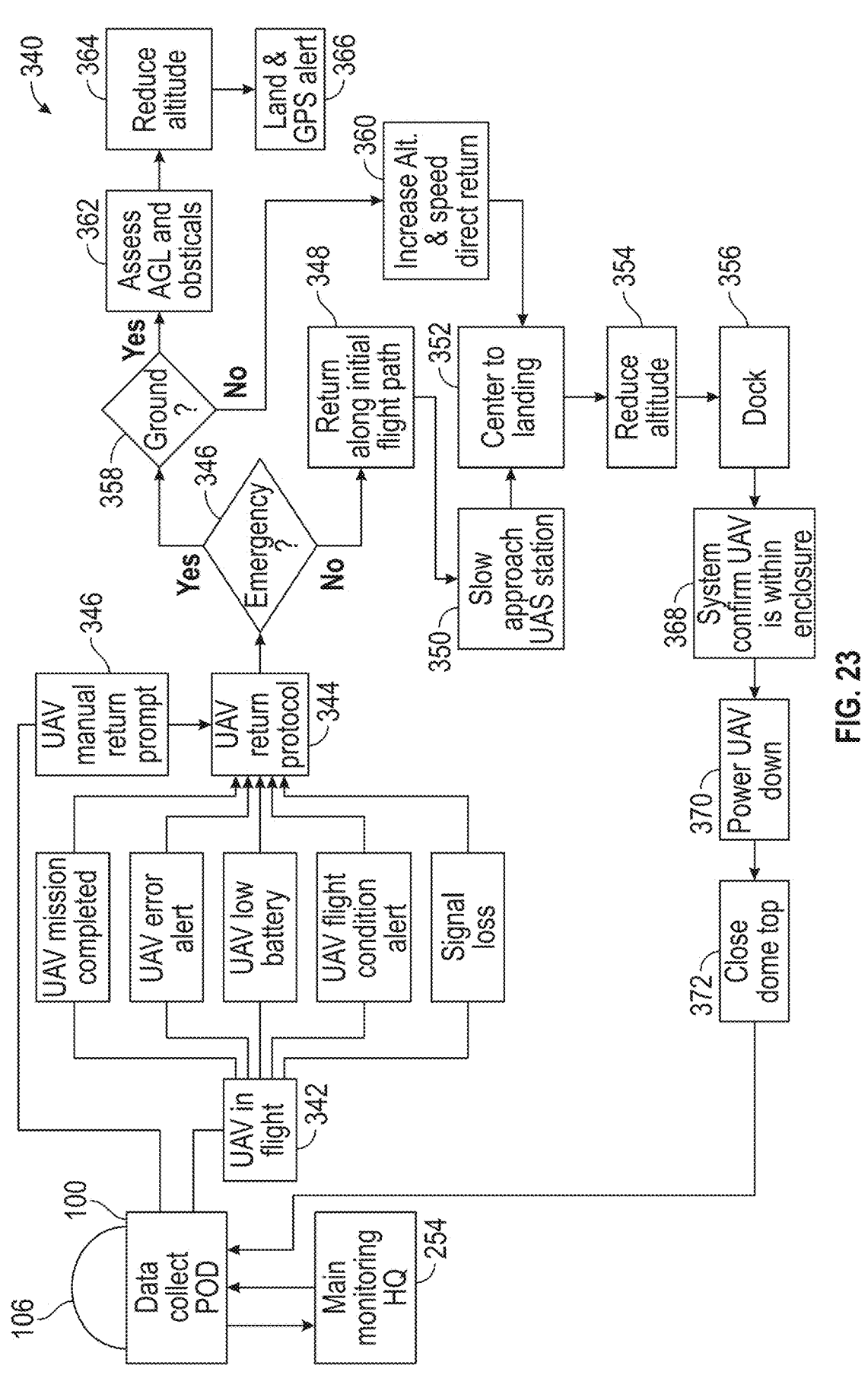
FIG. 23 is a flow chart diagram of a method for monitoring and controlling an unmanned aerial vehicle during flight by the data collection system of FIG. 21, according to one or more embodiments.

FIG. 23 is a flow chart diagram of a method 340 for monitoring and controlling UAV 120 during flight UAV 120 by data collection pod 100. Referring to FIGS. 21 and 23, when UAV 120 is in flight (step 342), various events or conditions may trigger a UAV return protocol 344, including successful mission completion, adverse flight conditions, signal loss between UAV 120 and the data collection pod 100 assigned with the flight control of UAV 120 (which may be passed from pod to pod during flight), low UAV battery, or various UAV errors, alerts, or casualties. As with pre-launch checks, system 10 identifies unsafe flight conditions through a multi-layered approach. External sensors, including an anemometer, thermometer, barometer, and humidity sensor, collect real-time weather data. This data is processed by an integrated AI algorithm. System 10 checks for pre-defined safety limits for parameters such as wind speed, temperature, atmospheric pressure, and moisture levels. In addition to weather data, system 10 also monitors for internal system parameters, such as low battery voltage, low communication signals, internal temperature, and GPS signal quality, and compares them against safe operating standards. If any of these parameters, whether external or internal, are outside of established tolerances, system 10 will trigger UAV return protocol 344. Additionally, at step 346, manual recall from monitoring headquarters 254 via pod 100 may initiate UAV return protocol 344, or in some embodiments, pod 100 may, sua sponte, trigger UAV return protocol

344 if it determines local conditions necessitating UAV recall without input from monitoring headquarters 254 or UAV 120.

Based on the event or condition that triggered UAV return protocol 344, at decision block 346, it is determined whether that event or condition constitutes an emergency. If not an emergency, at step 348, UAV 120 is directed to return along its initial flight path at normal speed. The system navigates the UAV back to pod 100 using a combination of GPS coordinates, inertial sensors, visual recognition, and an onboard precision landing system. System 10 first uses GPS coordinates to navigate to a pre-defined landing zone. As UAV 120 approaches pod 100, system 10 engages visual recognition software that works in conjunction with a laser or an infrared sensor system to provide precision guidance. The visual recognition system identifies pod 100 based on its unique structure and shape, allowing UAV 120 to perform a smooth landing at the landing zone. Accordingly, UAV 120 makes a slow, controlled approach to pod 100, centers above the landing zone, reduces altitude, and docks (steps 350, 352, 354, and 356, respectively). System 10 has built in redundancy with other components that can take over if the first or second approaches fail. If on the other hand it is determined that the event or condition that triggered UAV return protocol 344 is an emergency, at decision block 358, method 340 determines whether UAV 120 may safely return to pod 100 or whether it must make an emergency landing elsewhere. If UAV 120 may safely return to base, it returns at best course, speed and altitude, centers itself above the landing zone, reduces altitude, and docks (steps 360, 352, 354, and 356, respectively). If at step 358 it is determined that UAV 120 should be grounded, at steps 362, 364, and 366, ground clearance and obstacles are assessed using video streams and AI processing, UAV altitude is reduced, and UAV lands, transmitting landing location data to pod 100.

Returning back to docking step 356, at step 368 method 340 proceeds to confirm UAV 120 is properly positioned within pod 100, using proximity and guidance sensors 116 (FIGS. 2-7), as discussed above. If not properly positioned, UAV 120 hovers to reposition until it is proper. At step 370, UAV 120 is powered down, and at step 372, dome top 106 is closed. In one or more embodiments, the automatic closure of dome 106 is triggered when UAV 120 has successfully landed on the charging pad, and internal systems confirm that the UAV's rotors or motors have stopped rotating and power systems have been shut down. Upon receiving these signals, the housing will initiate the closure system. This closure process is designed to be quick and reliable, to protect the UAV from environmental conditions, and prevent any unauthorized access to the UAV while it is in storage.

Figure 24:
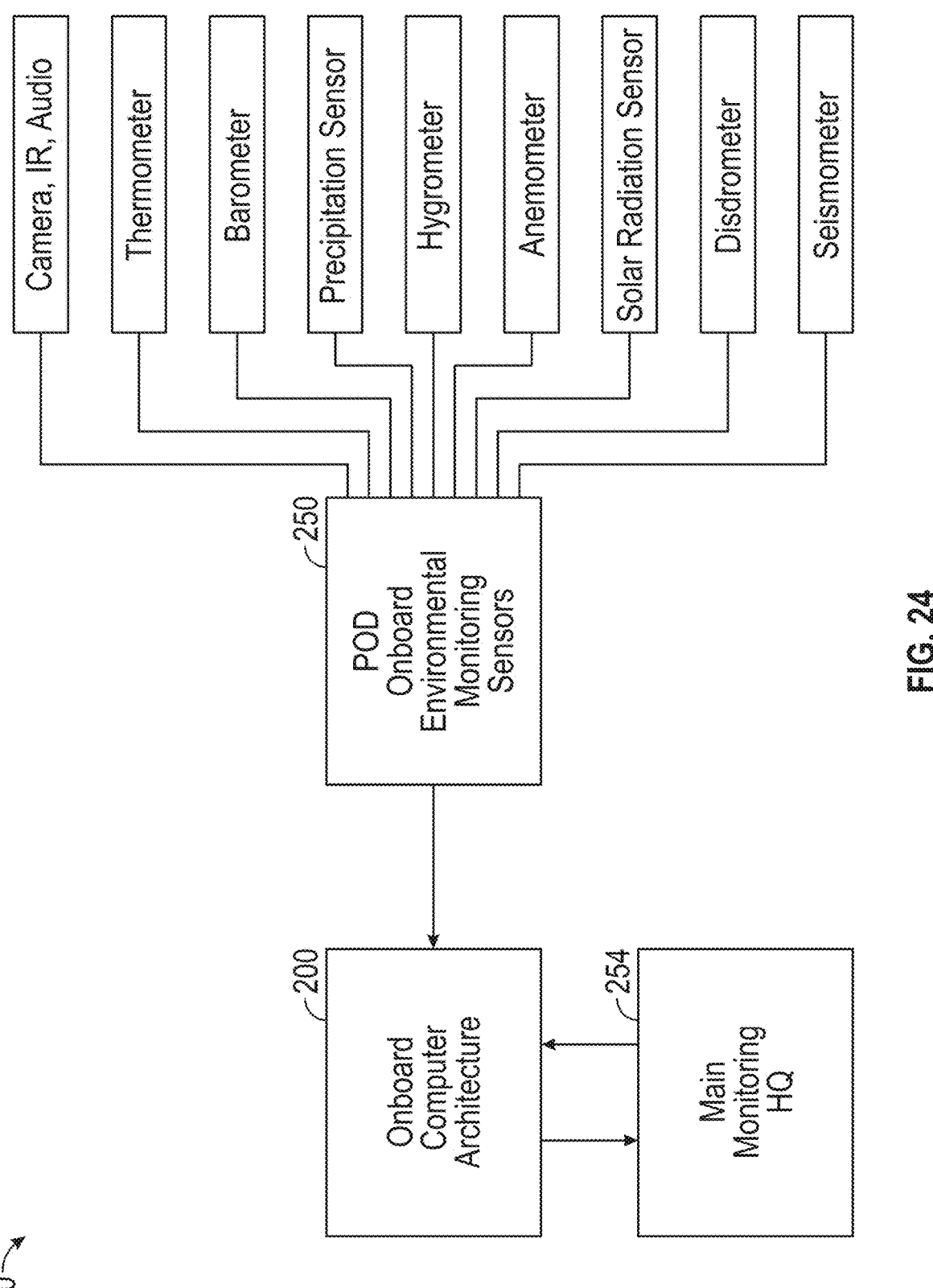
FIG. 24 is a block diagram of a data collection system including the onboard computer architecture of FIG. 20, that is implementable with the data collection pod of FIGS. 1-19, according to one or more embodiments particularly adapted for monitoring environmental conditions.

FIG. 24 is a block diagram of an embodiment of data collection system 10 for a given pod 100 (FIG. 1) that is particularly adapted for monitoring external (to the pod) environmental and situational conditions. Onboard computer architecture 200 controls and receives data from various pod sensors 250, which may be any of the type disclosed above or others not mentioned herein, but in particular may include sensors for measuring external temperature, barometric pressure, precipitation (accumulation, particle size and velocity), humidity, windspeed and direction, seismic movement or other motion, and solar radiation, as well as video, IR and audio sensors. Onboard computer architecture 200 is operatively coupled to sensors 250 as described above or by suitable methods as known to skilled artisans. Onboard computer architecture 200 is preferably communicatively coupled via internet, Wifi, Bluetooth, cellular, satellite and/or other radio communication capabilities to a remote main monitoring headquarters or control station 254, which may be operated by emergency services, law enforcement, military, for example, and wherein selective meteorological data is accessible by meteorological agencies or organizations.

Figure 25:
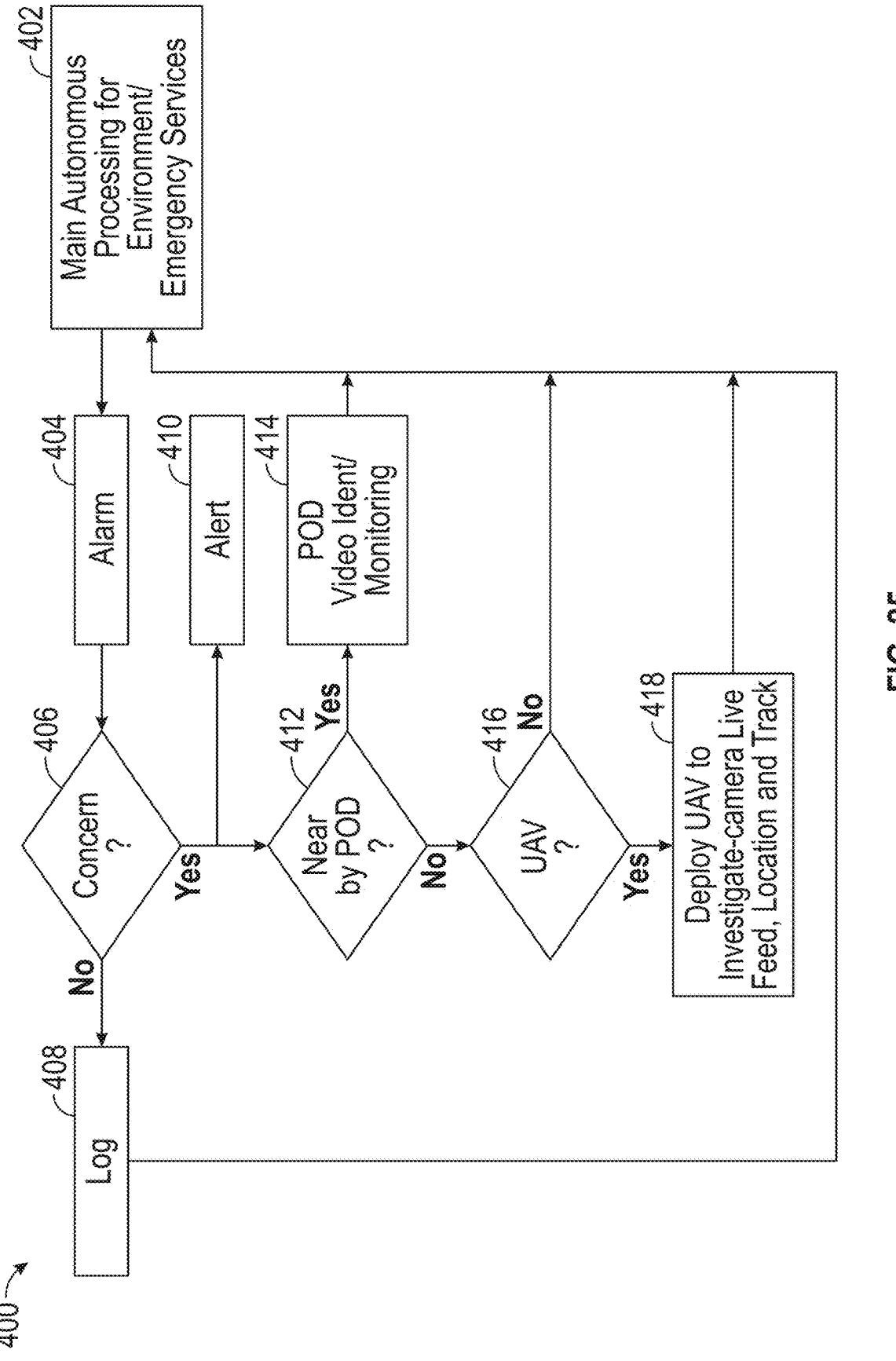
FIG. 25 is a flow chart diagram of a method for autonomous collection and processing of environmental conditions and/or for provision of emergency services by the data collection system of FIG. 24, according to one or more embodiments.

Referring now to FIGS. 24 and 25, FIG. 25 is a flow chart diagram of a exemplary method 400, according to one or more embodiments, for autonomous processing of monitored environmental conditions and/or for the provision of emergency services, which may be implemented by data collection system 10. Block 402 represents main autonomous processing of monitored environmental conditions, which is ideally processed by computer architecture 200 equipped with AI and ML capabilities. However, some of all data processing may occur remotely.

At step 404, data is collected from various sensors 250 and analyzed by computer architecture 200. The sensors may include sensors for measuring external temperature, barometric pressure, precipitation (accumulation, particle size and velocity), humidity, windspeed and direction, seismic movement or other motion, and solar radiation, as well as other sensors. Computer architecture 200 cycles through the received sensor data and analyzes the data. Out-of-parameter data trigger an alarm at step 404. The alarm condition 404 may also be triggered externally, for example from other pods or the main monitoring headquarters 254, such as to search for missing persons, victims, criminal suspects, or to surveil flooding, conflagrations, or other disasters. At decision block 406, method 400 determines whether this data represents a concern. If the data does not present a concern, the results are logged at step 408. However, if the data does present a concern, an alert is sent to the remote monitoring headquarters 254, and the frequency of monitoring may be increased (step 410). Further, at block 412, if it is determined that that the cause of the abnormal data is within range of video and other sensors of the pod, then at step 414 pod video and sensor streaming is provided to the remote monitoring headquarters 254. If the pod is equipped with a UAV (block 416), then at step 418 the UAV is deployed to investigate and provide a live camera feed and location of the cause of the alarm, and/or to identify and track vehicles or persons, for example.

The data transmission system sends a real-time video feed and georeferenced GPS location data to emergency responders or a remote command center through multiple secure communication protocols. This system utilizes a combination of compression algorithms, and packet management technologies to maintain a constant connection, and minimize latency in transmitting this data. All video and GPS data is also encrypted using advanced encryption standards, such as AES-256, to ensure that only authorized personnel can have access to the data, and to protect against unauthorized access, data breaches, and tampering. The system can automatically select the best protocol to maintain data transmission, depending on network capabilities.

Figure 26:
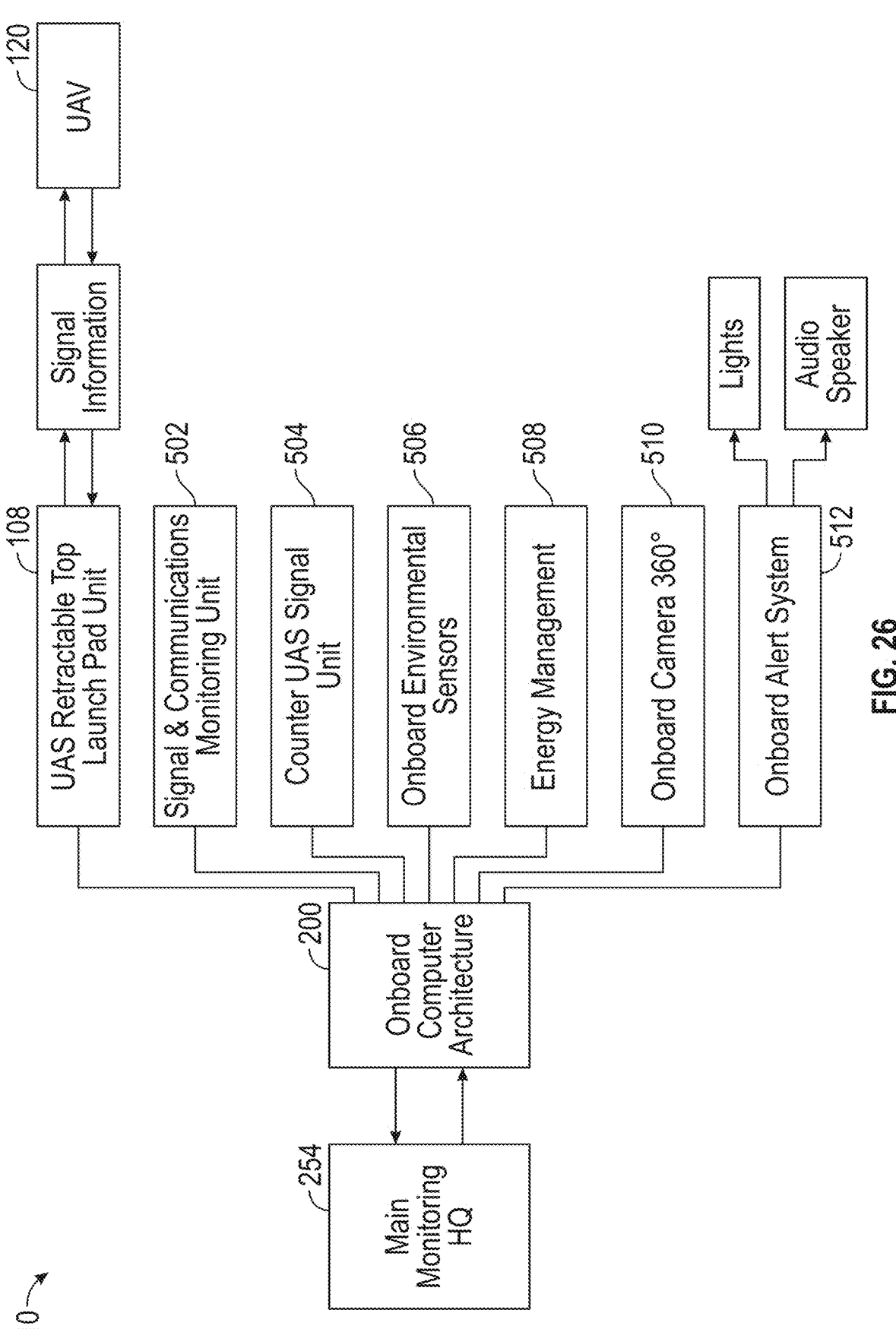
FIG. 26 is a block diagram of a data collection system including the onboard computer architecture of FIG. 20, that is implementable with the data collection pod of FIGS. 1-19, according to one or more embodiments that is particularly adapted for defense or military applications.

FIG. 26 is a block diagram of an embodiment of data collection system 10 for a given pod 100 (FIG. 1) that is particularly adapted for military or defense applications. Onboard computer architecture 200 controls and receives data from various pod sensors and systems, which may be any of the type disclosed above or others not mentioned herein, but in particular include those associated with a UAS 108, a signal and communications monitoring unit 502, a counter UAS signal unit 504, onboard environmental sensors 506 (which may include chemical, biological and radiological sensors), energy management 508, a 360 degree onboard camera 510, and on onboard alert system 512. Onboard computer architecture 200 is operatively coupled to these systems and sensors as described above or by suitable methods as known to skilled artisans. Onboard computer architecture 200 is preferably communicatively coupled via internet, Wifi, Bluetooth, cellular, satellite and/or other radio communication capabilities to a remote main monitoring headquarters or control station 254, which may be operated by governmental or military organizations.

Figure 27:
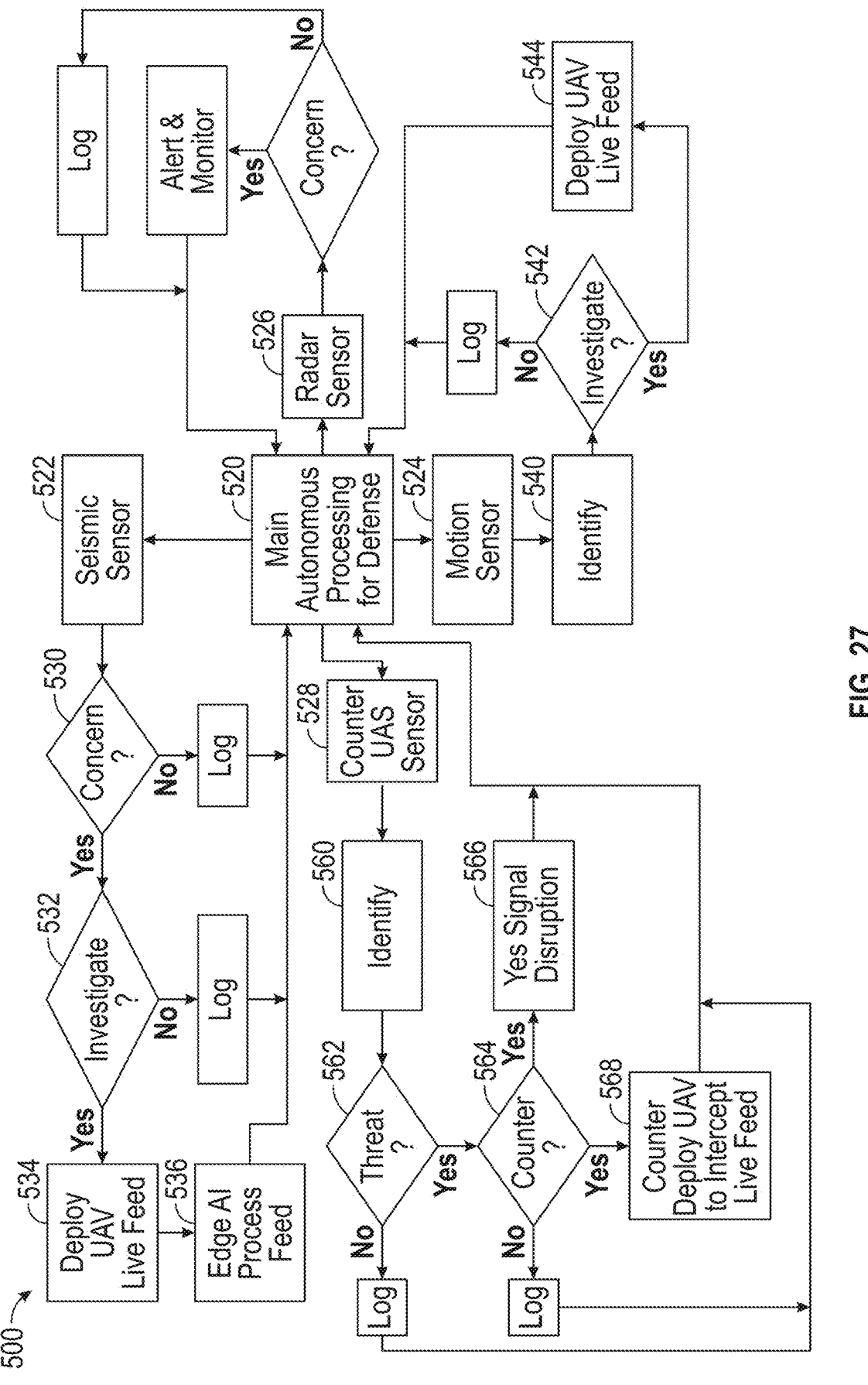
FIG. 27 is a flow chart diagram of a method for autonomous collection and processing of conditions that is particularly adapted for defense or military applications, and which may be implemented with the data collection system of FIG. 26, according to one or more embodiments.

Referring now to FIGS. 26 and 27, FIG. 27 is a flow chart diagram of a exemplary method 500, according to one or more embodiments, for autonomous processing for defense or military applications, which may be implemented by data collection system 10. Block 520 represents main autonomous processing by computer architecture 200 equipped with AI and ML capabilities, which receives and analyzes data streams from various sensors, including seismic sensors, motion sensors, radar, and counter-UAS systems (steps 522, 524, 526, and 528, respectively). At decision blocks 530 and 532, system 10 determines whether seismic data represents a concern, and if so, whether the UAV should be deployed to investigate. If the answer to the first two queries is in the negative, the output is logged; otherwise at step 534 the UAV is deployed, and at step 536, system 10 analyzes the sensor feed from the UAV using AI edge processing techniques. Similarly, while at step 524, motion sensor data is analyzed, at step 540, advanced AI techniques are used to identify sources of motion. A decision block 542, system 10 determines whether the UAV should be deployed to investigate the source or cause of motion. If not, the output is logged, but if investigation is warranted, the UAV is deployed and live feed is transmitted to computer architecture 200.

Method 500 processes radar sensor data at step 526. At decision block 550, system 10 determines whether particular received radar signals constitute a cause for concern, In not, output is logged; otherwise system 10 sends an alert to main monitoring headquarters 254 and continues monitoring. As another example of autonomous processing, method 500 receives data from counter UAS sensors at step 528 and identifies sources at step 560. At decision blocks 562 and 564 respectively, system 10 determines whether particular received counter-UAS signatures constitute a threat and what type of countermeasures, including signal disruption measures (step 566) and/or UAV interception (568), should be instigated.

With the increasing interest in space exploration and the need for efficient remote data collection, storage, and communication in outer space, there is a growing demand for advanced UAV systems and vessels that can operate in extraterrestrial environments as well as on earth. In one or more embodiments, the data collection pod 100 is designed for outer space applications and includes mechanical, power and electronic systems designed to function in space, such as advanced batteries and solar panels. In embodiments intended for space application, pod 100 is designed to withstand the harsh conditions of outer space, including extreme temperatures, radiation, and microgravity through the construction of appropriate materials. Pod 100 ideally includes advanced energy storage systems, high-efficiency solar panels integrated into the retractable dome panels, and multiple communication protocols to facilitate robust and versatile data transfer. For instance, the system incorporates advanced energy storage systems designed to function efficiently in the vacuum of space, and the extreme temperature fluctuations of outer space. These systems include high energy density solid state batteries with a high tolerance for radiation, designed for optimal performance with long-term missions. These batteries are shielded from radiation exposure by using specially designed coatings and layers of material to ensure high performance even in the most demanding environments, and to reduce the need for additional maintenance or part replacement.

For space applications, pods 100 may be deployed on space stations and/or satellites to cover extensive areas. Data collection pod 100 with the UAV housing and deployment unit 108 may serve as a space vehicle auxiliary mounted storage and launch vessel, as well as serves as a communications transfer terminal, data collection, storage, and transfer station. In addition, pod 100 can act as a collection and storage receptacle for foreign and identified objects or matter for transport and research, or as a general protective housing for all that can fit within. Due to its retractable dome top with minimal footprint when fully open, pod 100 offers a reduction in overall size by over 40 percent, making it ideal for the compact transportation needs on space launch vehicles and space craft. If constructed large enough, pod 100 can also act as a safety vessel for astronauts or equipment in space emergency situations.

It will be understood from the foregoing description that modifications and changes may be made in various embodiments of the present invention without departing from its true spirit. The descriptions in this specification are for purposes of illustration only and are not to be construed in a limiting sense.

The Abstract of the disclosure is solely for providing the a way by which to determine quickly from a cursory reading the nature and gist of technical disclosure, and it represents solely one or more embodiments.

What is claimed:

1. A data collection system for use with an Unmanned Aerial Vehicle comprising:
   a base unit having an upper end defining a first profile;
   a top unit having a lower end defining a second profile designed and arranged to be removably mated with said first profile, said top unit removably coupled at said lower end to said base unit;
   a computer coupled to a data bus, said data bus passing from said base unit to said top unit;
   a first sensor coupled to said data bus, said computer adapted to receive data from said first sensor.

2. The system of claim 1 further comprising:
   a first module having an upper end defining said first profile and a lower end defining said second profile, said lower end of said first module connected to said upper end of said base unit, said lower end of said top unit connected to said upper end of said first module, said data bus passing through said first module, said first sensor disposed within said first module.

3. The system of claim 1 further comprising:
   a hangar bay disposed in said top unit and arranged for storing an unmanned aerial vehicle therein, said hangar bay being selectively openable so as to allow for launch and recovery of said unmanned aerial vehicle; wherein said computer is operable to wirelessly communicate with said unmanned aerial vehicle.

4. The system of claim 3 further comprising:
   a selectively retractable roof formed in said top unit so as to allow for launch and recovery of said unmanned aerial vehicle, said computer being operatively coupled to said retractable roof for selective operation thereof.

5. The system of claim 3 further comprising:
   a charging pad disposed in said hangar bay operable to electrically charge said unmanned aerial vehicle.

6. The system of claim 1 wherein:
   said base unit and said top unit are characterized by a generally cylindrical shape; and
   said top unit has a generally hemispherical dome roof.

7. The system of claim 6 further comprising:
   a solar panel disposed on said roof; and
   a battery electrically coupled to said solar panel.

8. The system of claim 1 wherein:
   said first sensor is selected from the group consisting of a temperature sensor, a humidity sensor, a barometric pressure sensor, a wind speed sensor, a precipitation sensor, a voltage sensor, a current sensor, a hall effect sensor, an infrared sensors, a pressure sensor, a vibration sensor, an accelerometer, an inertial sensor, a light detection and ranging sensor, a navigational sensor, a positioning sensor, a global navigation satellite system sensor, a proximity sensor, a magnetic sensor, a fire sensor, a smoke sensor, an electromagnetic interference sensor, a radiation sensor, a chemical sensor, a biological agent sensor, a nuclear sensor, a proximity sensor, an ultrasonic sensor, a capacitive sensor, a visual camera sensor, an infrared camera sensor, and an acoustic sensor.

9. The system of claim 1 further comprising:
   a bracket mounted to a lower end of said base unit and arranged for mounting said base unit to one from the group consisting of a utility pole, a sign post, a traffic signal, a lamp post, an antenna mast, a cell phone tower, a ship masts, a flagpole, a building, a chimney, a fence, a buoy, a bridge, and a vehicle.

10. The system of claim 1 further comprising:
    an artificial intelligence computing module coupled to said computer and arranged to analyze data from said first sensor.

11. The system of claim 1 wherein:
    said computer is communicatively coupled to a remote monitoring station.

12. The system of claim 1 wherein:
    said first and second profiles are characterized by a quick-connect twist-lock feature.

13. A data collection system for use with an Unmanned Aerial Vehicle comprising:
    a pod housing having an upper end that is removably coupled to a lower end, the upper end having a retractable roof and a hangar bay disposed below said retractable roof,
    a bracket mounted to the lower end of said pod housing and arranged for mounting said pod housing to one from the group consisting of a utility pole, a sign post, a traffic signal, a lamp post, an antenna mast, a cell phone tower, a ship masts, a flagpole, a building, a chimney, a fence, a buoy, a bridge, and a vehicle;
    a computer disposed within said pod housing, said computer operatively coupled to said retractable roof for selective operation thereof; and
    a first sensor coupled to said computer, said computer adapted to receive data from said first sensor.

14. The system of claim 13 wherein:
    said pod housing is characterized by a generally cylindrical shape; and
    said retractable roof has a generally hemispherical dome shape.

15. The system of claim 13 further comprising:
    a solar panel disposed on said roof; and
    a battery electrically coupled to said solar panel.

16. The system of claim 13 further comprising:

a charging pad disposed in said hangar bay operable to electrically charge an unmanned aerial vehicle when located in said hangar bay.

17. The system of claim 13 further comprising:

an artificial intelligence computing module coupled to said computer and arranged to analyze data from said first sensor.

18. A data collection system comprising:

a plurality of data collection pods disposed at a plurality of interspersed locations within a geographical area of interest, each of said plurality of pods including one or more sensors therein and a computer operatively coupled to said one or more sensors for receiving and processing data therefrom, one or more of said plurality of pods having a base unit and one or more modules removably coupled to the top of said base unit and a data bus passing from base unit to said one or more modules; and a station disposed remotely from said plurality of pods, said station communicatively coupled to the computer of each of said plurality of pods for controlling said pod and receiving data from the one or more sensors; wherein at least a first of said plurality of pods includes a deployable unmanned aerial vehicle, said unmanned aerial vehicle being wirelessly controllable by said computer of said first pod, said unmanned aerial vehicle being selectively controllable from said station via said first pod.

19. The system of claim 18 wherein:

the computer of each of said plurality of pods is operable to wirelessly control said unmanned aerial vehicle, whereby as the unmanned aerial vehicle nears a limit of a wireless range from said first pod, a second of said plurality of pods assumes control of said unmanned aerial vehicle.

20. The system of claim 18 further comprising:

a video camera disposed in said unmanned aerial vehicle;

a wireless communications link between said video camera and said first pod; whereby a live video feed from said video camera may be streamed to said station via said first pod.

21. The system of claim 18 further comprising:

an artificial intelligence computing module coupled to said computer of said first pod and arranged to analyze data from said one or more sensors of said first pod.

22. The system of claim 18 further comprising:

a battery disposed in one or more of said plurality of pods; whereby each of said one or more of said plurality of pods may be powered by said battery, an external source of electricity, or a combination thereof.

23. The system of claim 22 further comprising:

a solar panel disposed on said one or more of said plurality of pods, said solar panel electrically coupled to said battery of said one or more of said plurality of pods; whereby each of said one or more of said plurality of pods may be powered by said solar panel, battery, an external source of electricity, or a combination thereof.

24. The system of claim 18 further comprising:

one or more communication links coupled between each of said plurality of pods and said station selected from the group consisting of an internet connection, a dedicated electrical connection, a dedicated fiber optic connection, and a wireless connection, wherein said wireless connection is selected from the group consisting of a satellite connection, a microwave connection, a cellular connection, a Wi-fi connection, a Bluetooth connection, or another type of electromagnetic or radio connection.

25. A data collection method comprising:

placing a plurality of data collection pods at a plurality of interspersed locations within a geographical area of interest, each of said plurality of pods including one or more sensors therein and a computer operatively coupled to said one or more sensors for receiving and processing data therefrom, one or more of said plurality of pods having a base unit and one or more modules units removably coupled to the top of said base unit and a data bus passing from said base unit to said one or more modules;

establishing a communications link between each of said plurality of pods and a remote station;

housing an unmanned aerial vehicle in a first of said plurality of pods;

launching said unmanned aerial vehicle from said first of said plurality of pods; and communicating between said unmanned aerial vehicle during flight and said computer of said first of said plurality of pods.

26. The method of claim 25 further comprising:

opening a retractable roof of said first of said plurality of pods prior to said launching said unmanned aerial vehicle;

landing said unmanned aerial vehicle in said first of said plurality of pods; and closing said retractable roof of said first of said plurality of pods after said landing.

27. The method of claim 25 further comprising:

streaming live video from said unmanned aerial vehicle during flight to said remote station via said first of said plurality of pods.

28. The method of claim 25 further comprising:

communicating between said unmanned aerial vehicle during flight and said a second of said plurality of pods; and then communicating between said unmanned aerial vehicle during flight and said a third, of said plurality of pods.

29. The method of claim 25 further comprising:

processing data from said one or more sensors of a second of said plurality of pods by said computer of said second of said plurality of pods using an artificial intelligence algorithm; and transmitting by said second of said plurality of pods a result of said processing data to said remote station.

30. The method of claim 25 further comprising:

disposing a solar panel on a third of said plurality of pods that is electrically coupled to a battery; and powering said third of said plurality of pods by solar power.

* * * * *